July 16, 1940.　　C. A. BICKEL ET AL　　2,208,319
LATHE
Filed Aug. 26, 1936　　14 Sheets-Sheet 1

INVENTORS
CLIFFORD A. BICKEL
KURT H. WILLS
BY
Toulmin & Toulmin
ATTORNEYS

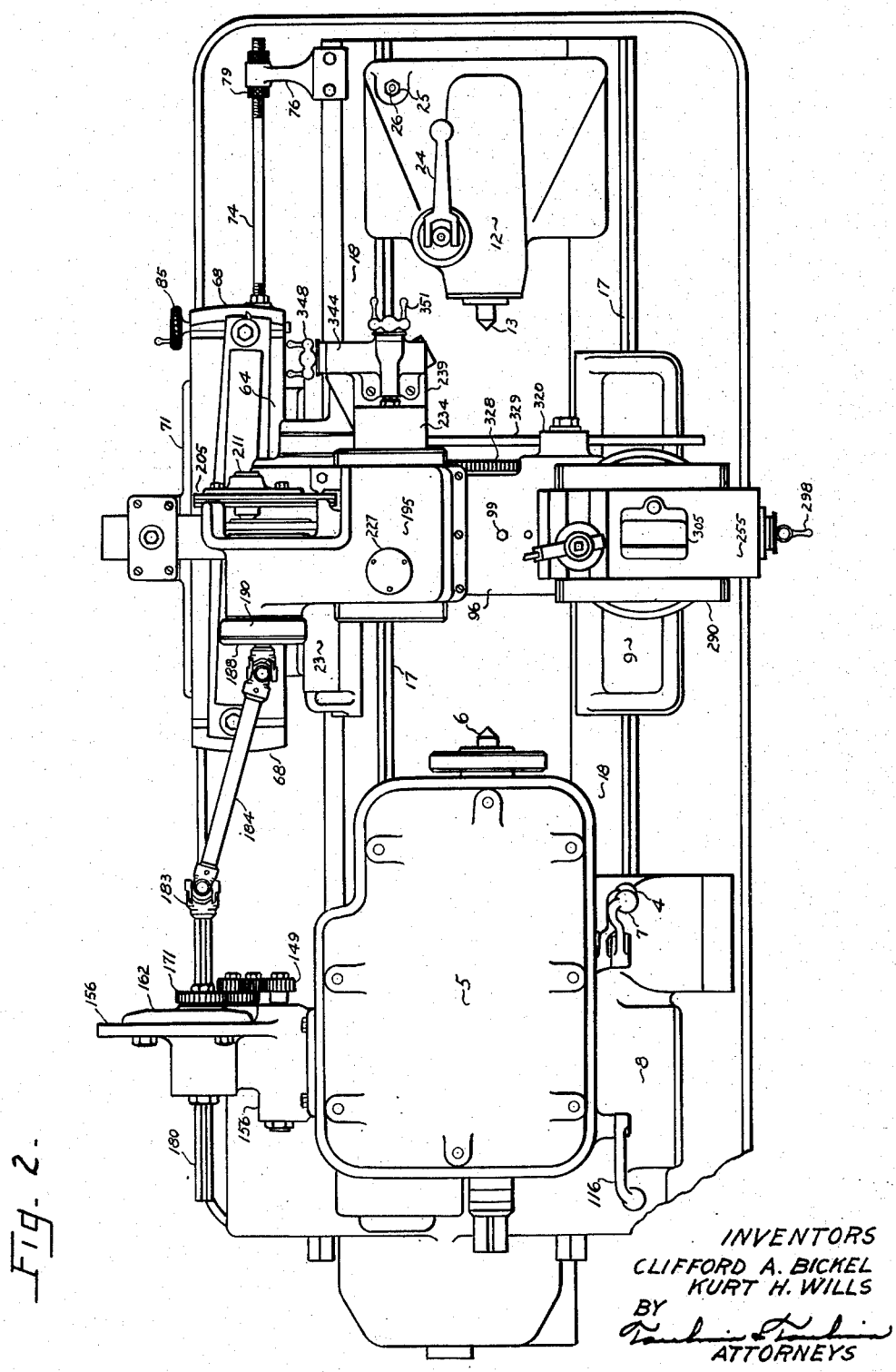

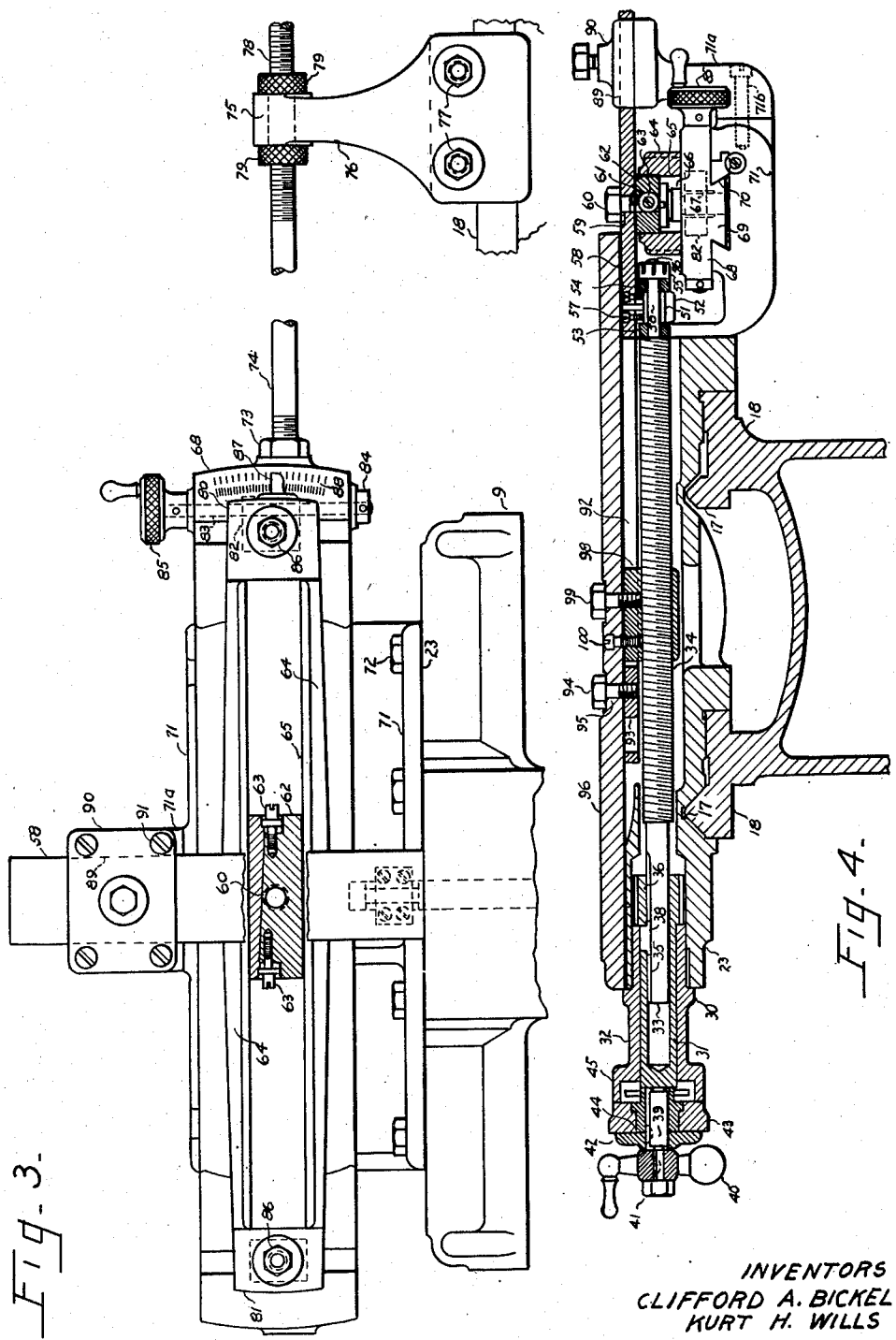

July 16, 1940.    C. A. BICKEL ET AL    2,208,319
LATHE
Filed Aug. 26, 1936    14 Sheets-Sheet 4
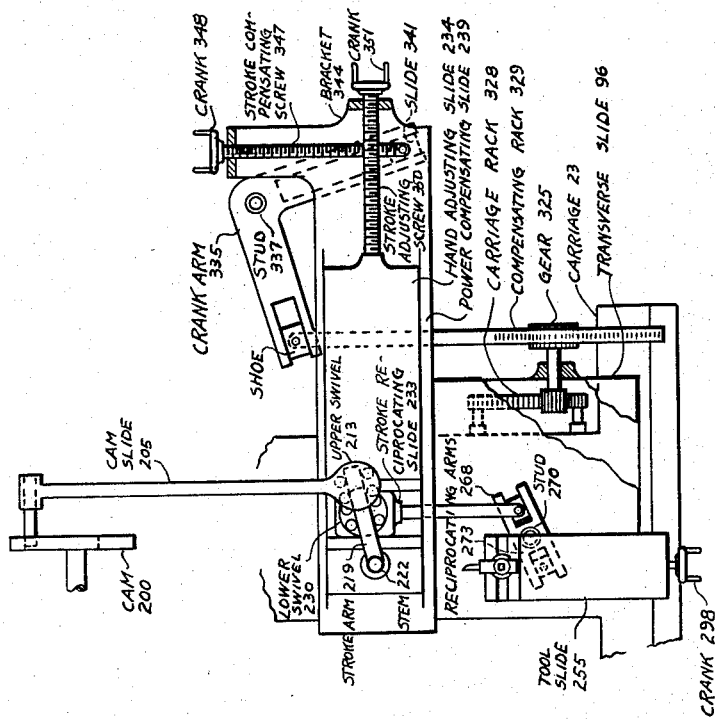
_Fig. 6_
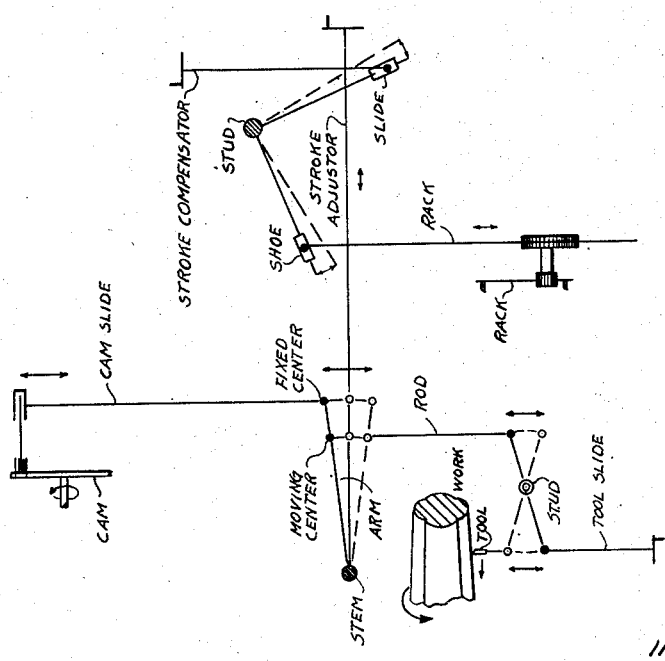
_Fig. 5_
INVENTORS
CLIFFORD A. BICKEL
KURT H. WILLS
BY
ATTORNEYS

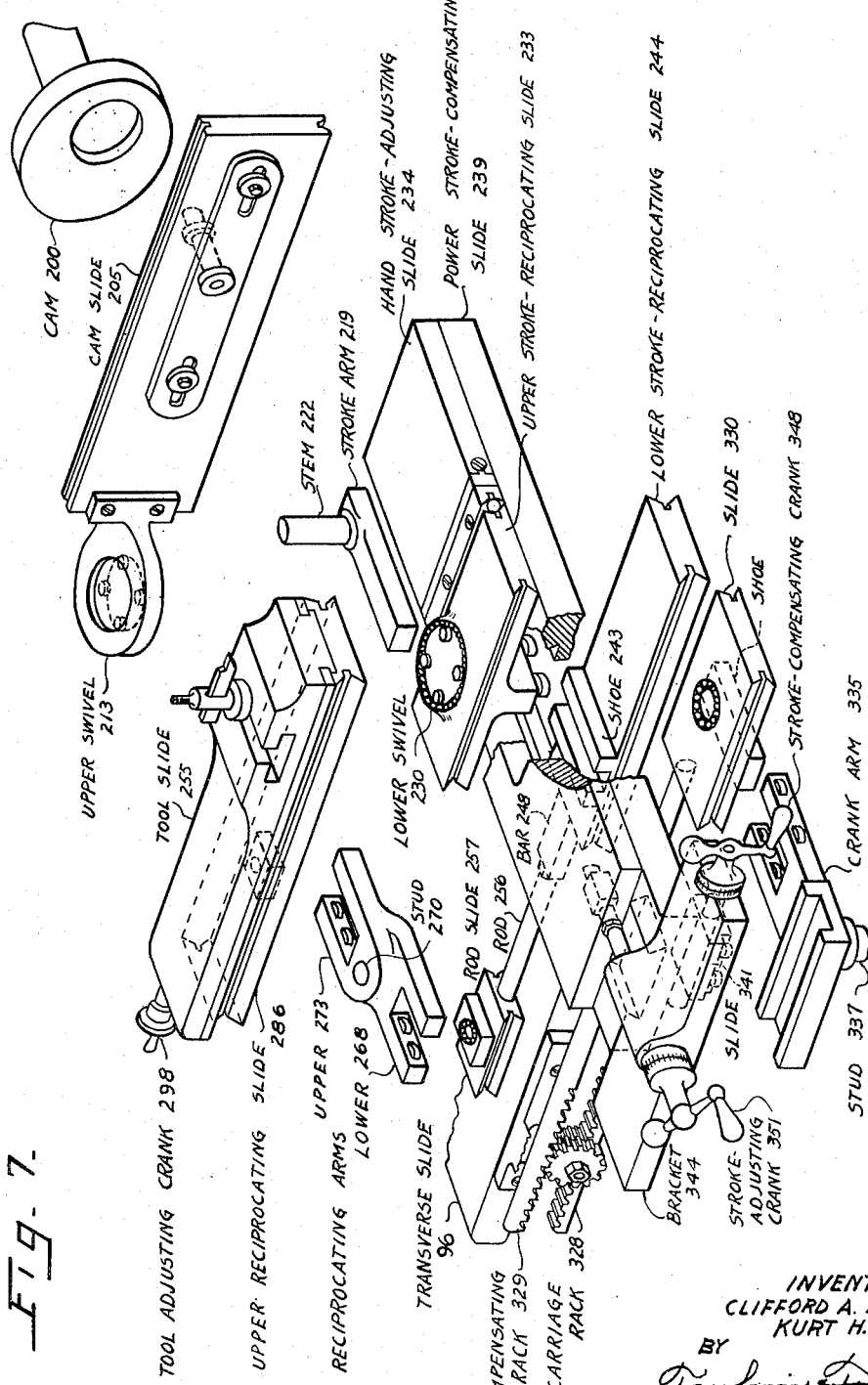

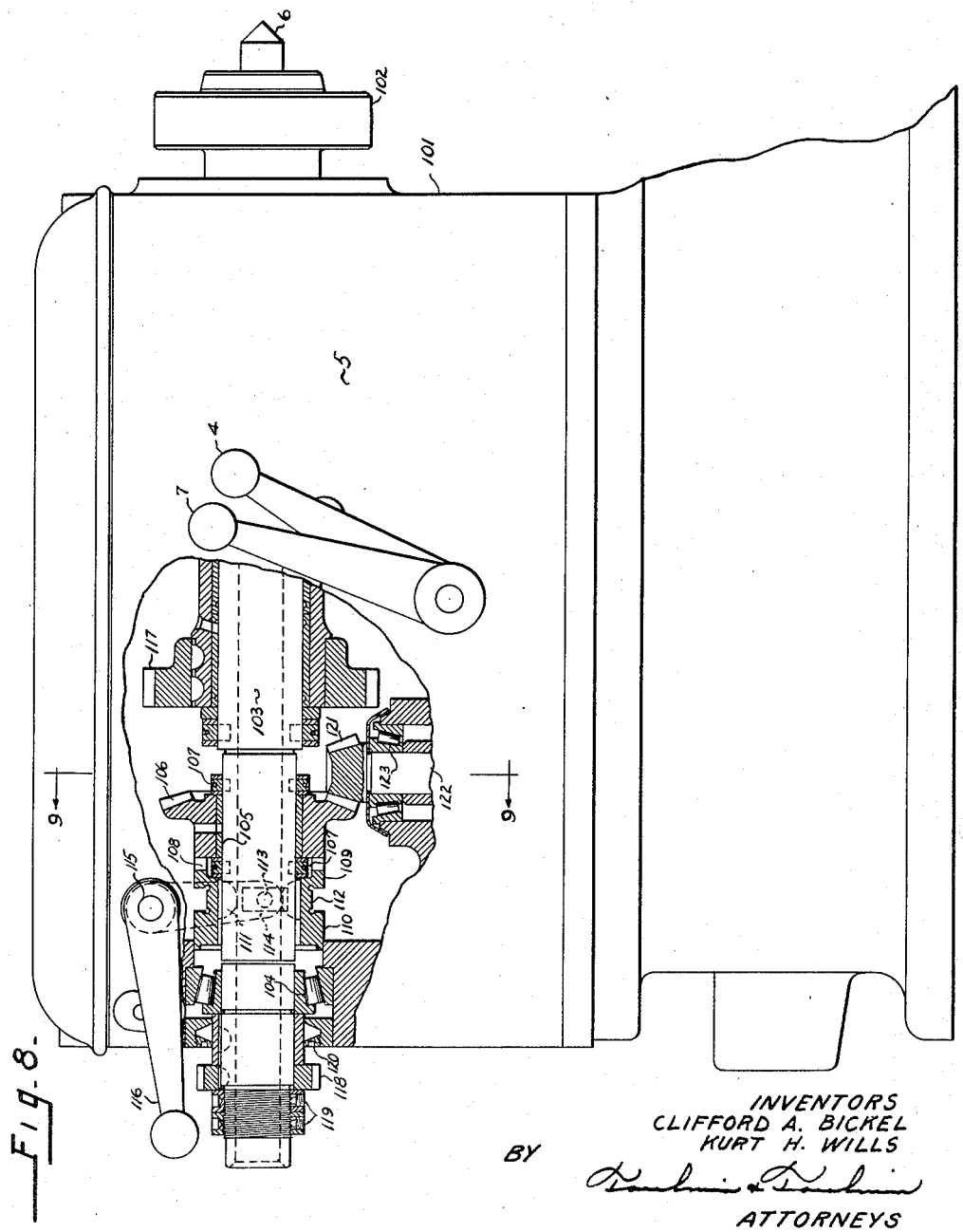

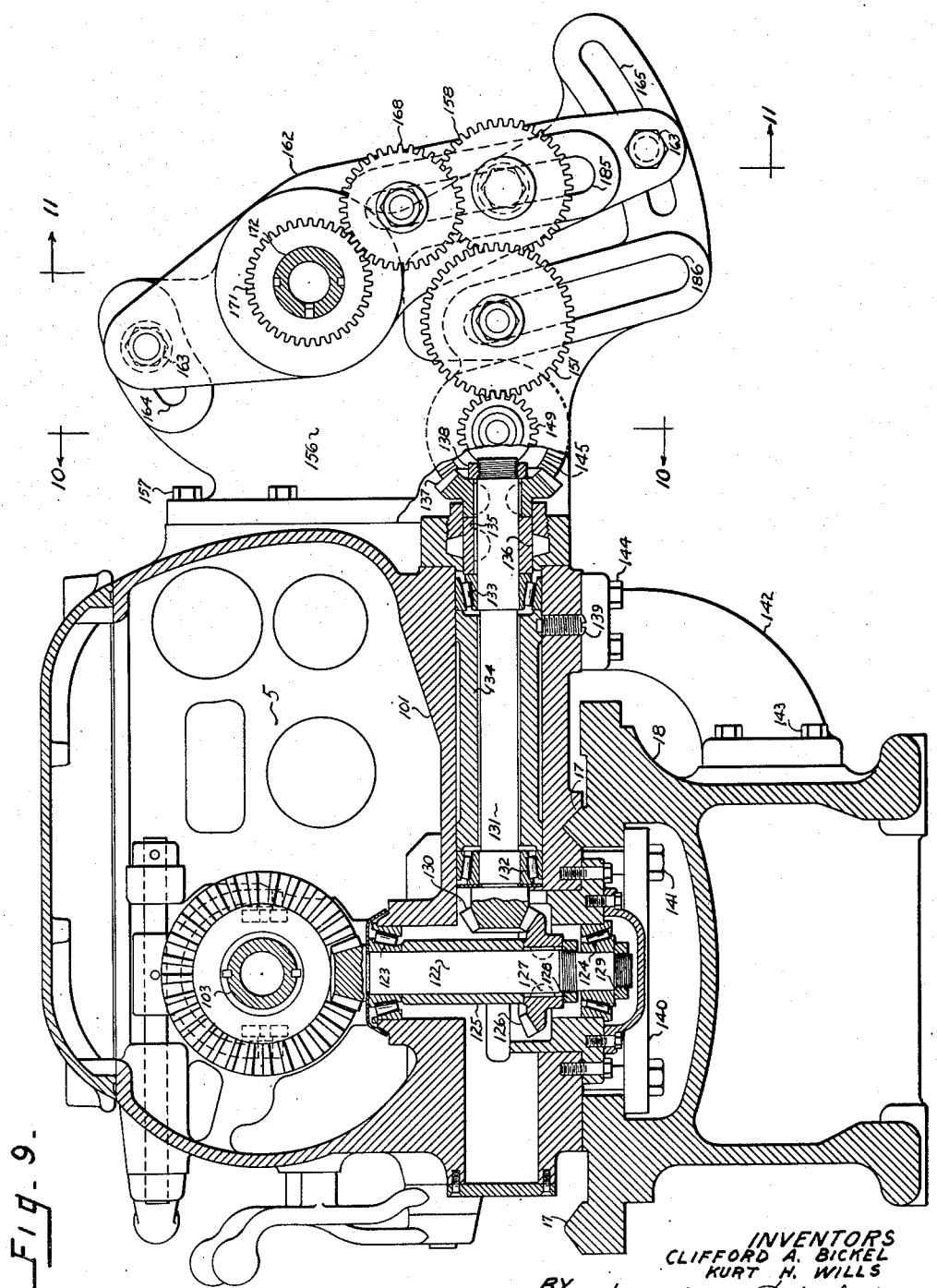

July 16, 1940.  C. A. BICKEL ET AL  2,208,319
LATHE
Filed Aug. 26, 1936   14 Sheets-Sheet 8
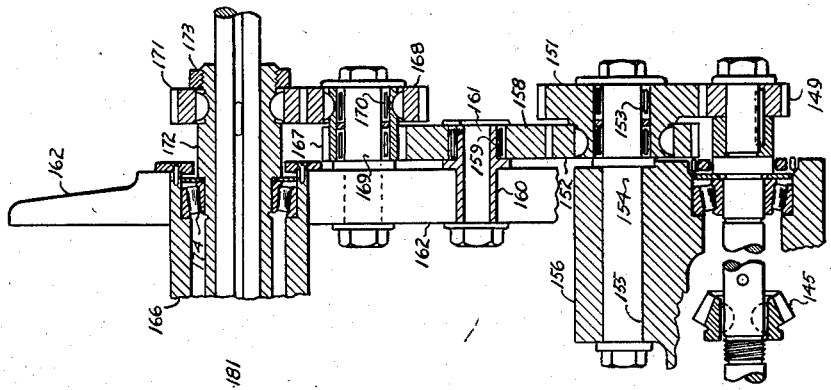
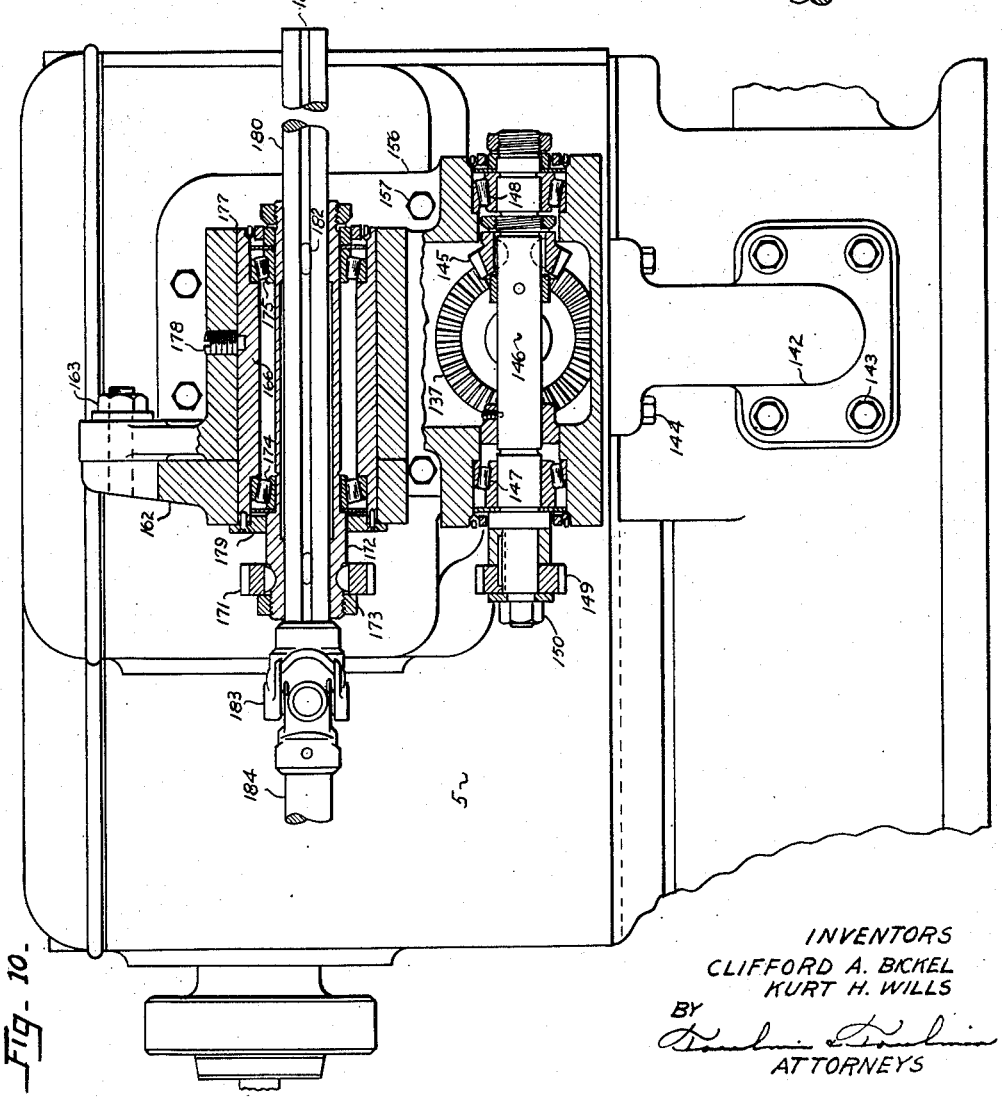
INVENTORS
CLIFFORD A. BICKEL
KURT H. WILLS
BY
ATTORNEYS

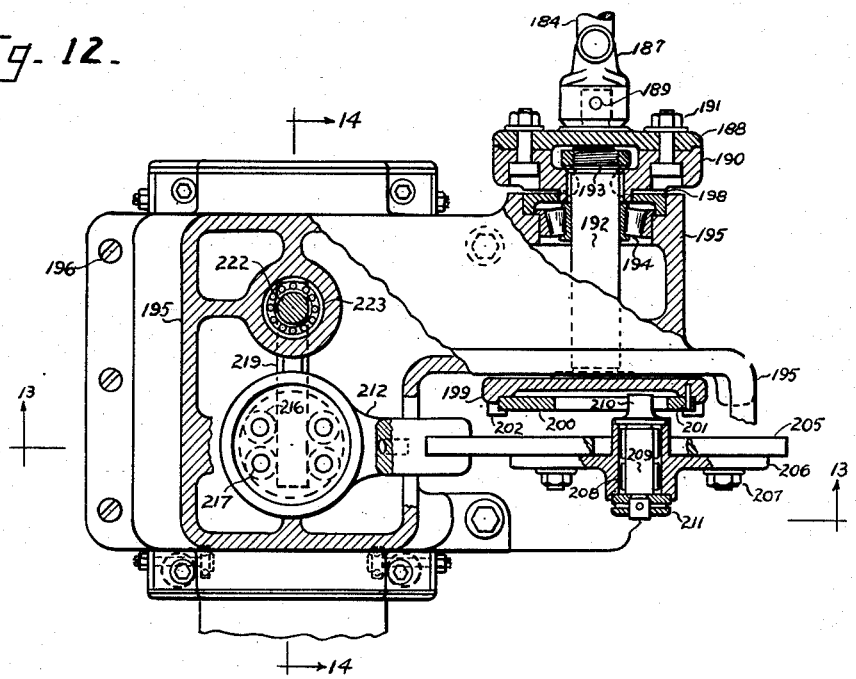
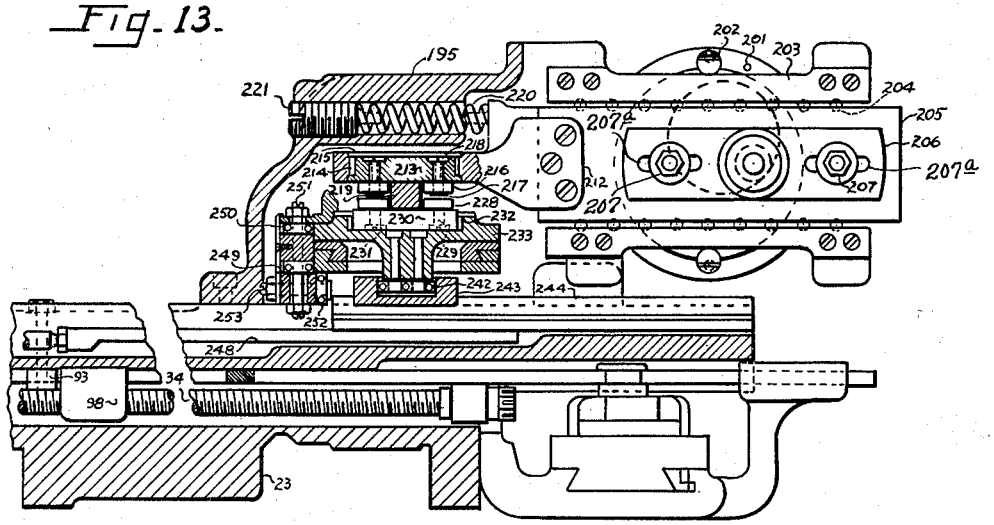

July 16, 1940.  C. A. BICKEL ET AL  2,208,319
LATHE
Filed Aug. 26, 1936   14 Sheets-Sheet 10
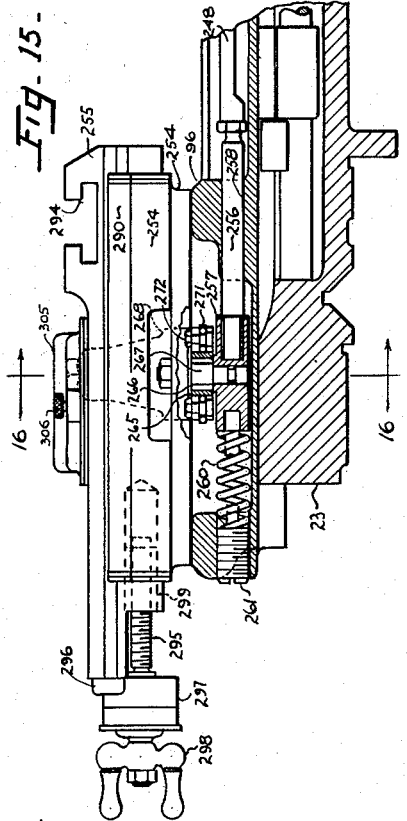
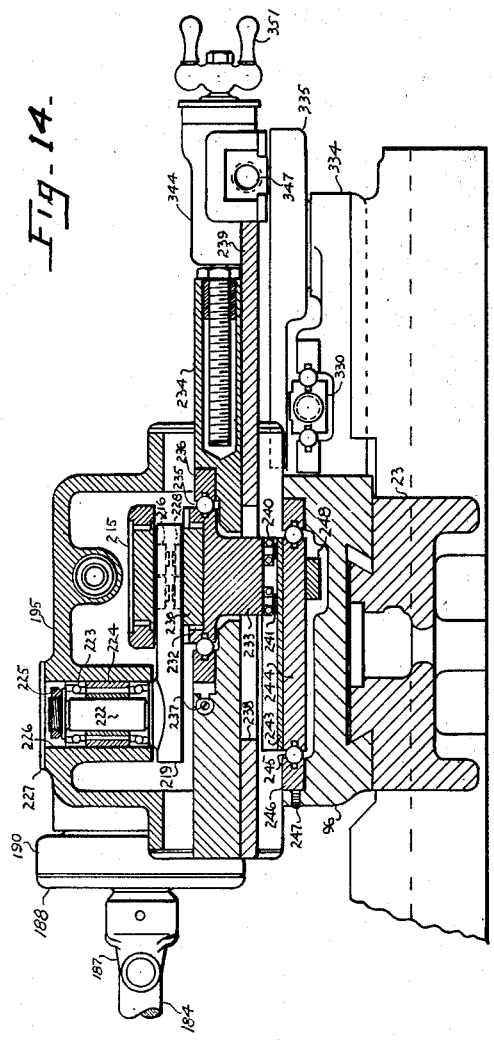
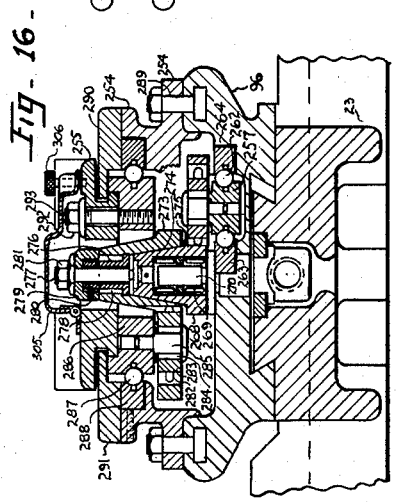
INVENTORS
CLIFFORD A. BICKEL
KURT H. WILLS
BY
ATTORNEYS

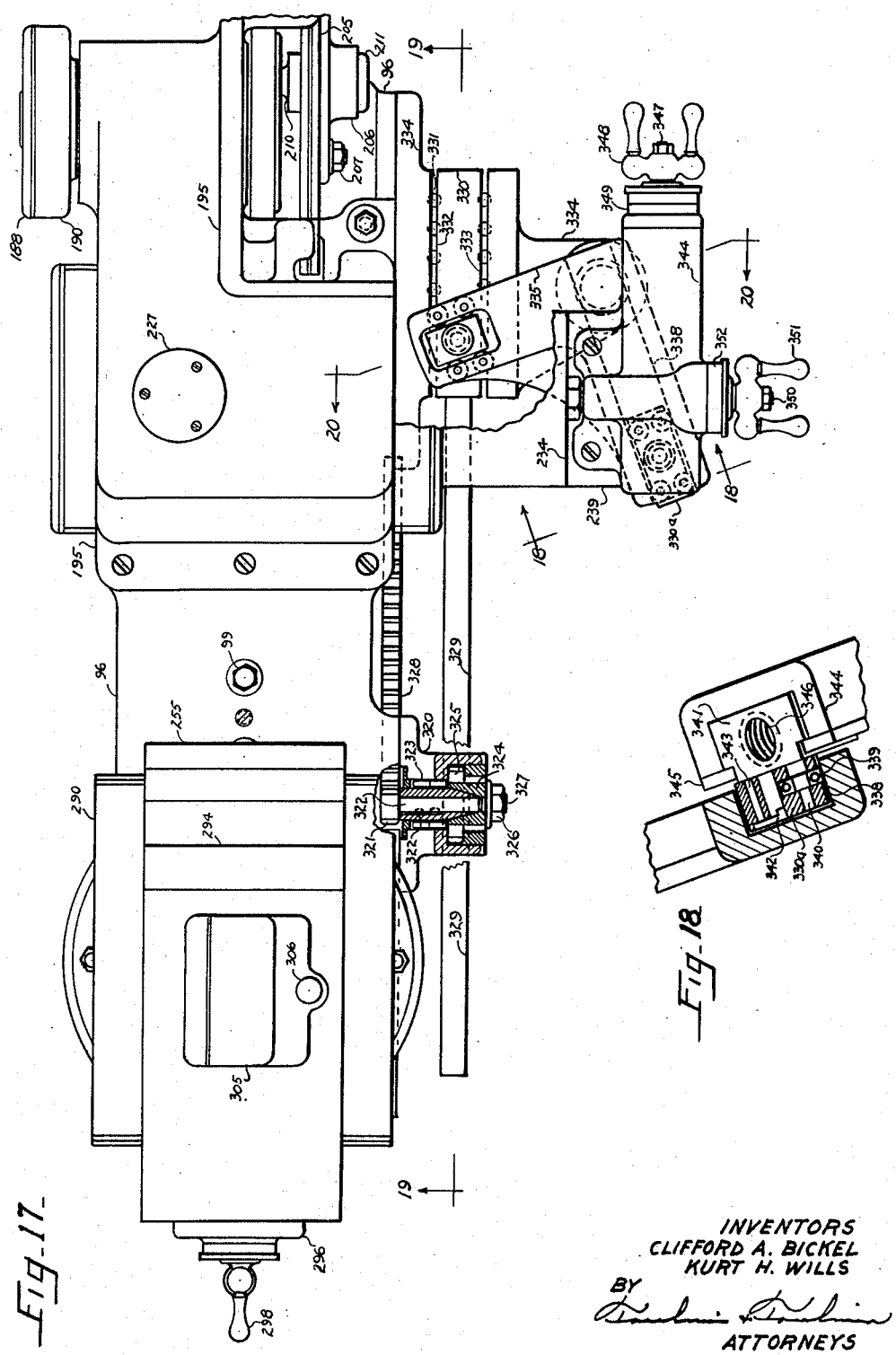

July 16, 1940.    C. A. BICKEL ET AL    2,208,319
LATHE
Filed Aug. 26, 1936    14 Sheets-Sheet 12

INVENTORS
CLIFFORD A. BICKEL
KURT H. WILLS
BY
ATTORNEYS

July 16, 1940.  C. A. BICKEL ET AL  2,208,319
LATHE
Filed Aug. 26, 1936  14 Sheets-Sheet 13
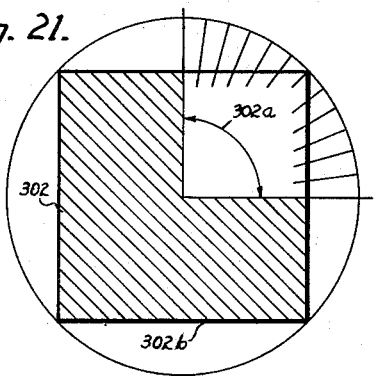
Fig. 21.
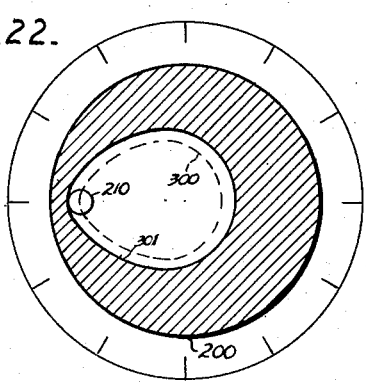
Fig. 22.
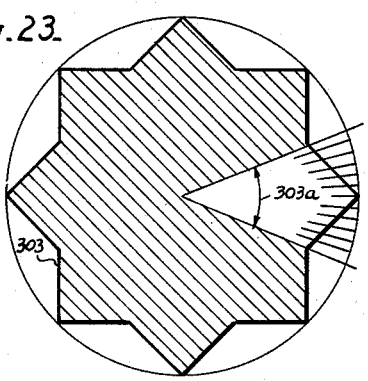
Fig. 23.
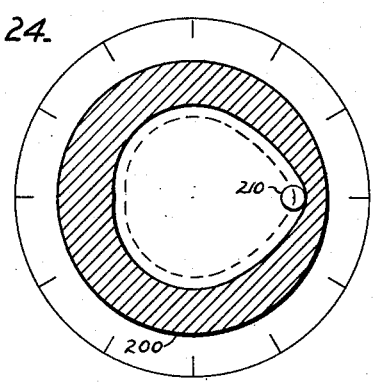
Fig. 24.
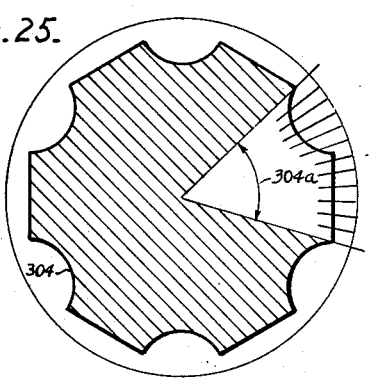
Fig. 25.
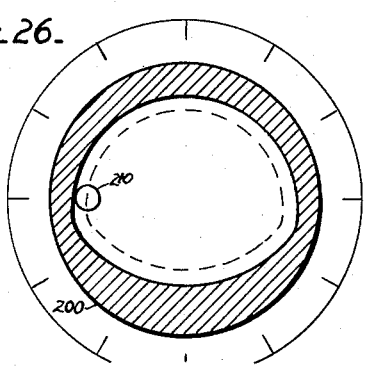
Fig. 26.
INVENTORS
CLIFFORD A. BICKEL
KURT H. WILLS
BY 
ATTORNEYS July 16, 1940.     C. A. BICKEL ET AL     2,208,319
LATHE
Filed Aug. 26, 1936     14 Sheets-Sheet 14
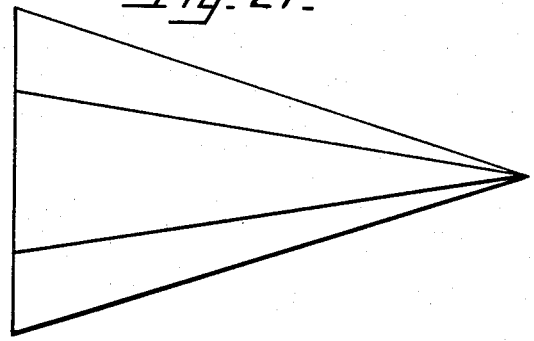
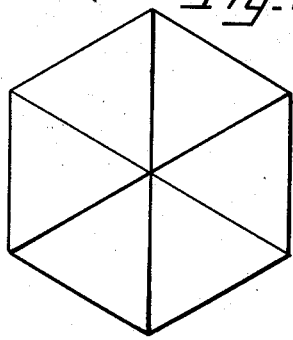
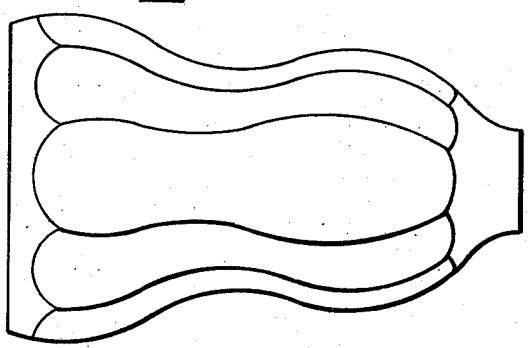
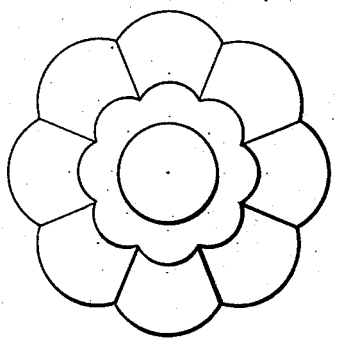
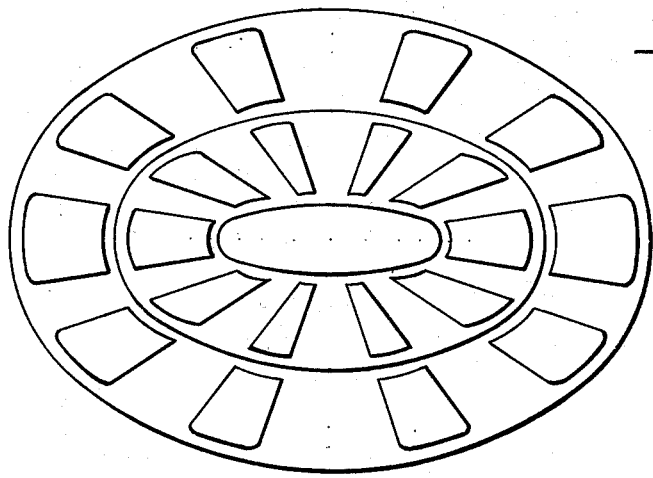
INVENTORS
CLIFFORD A. BICKEL
KURT H. WILLS
BY 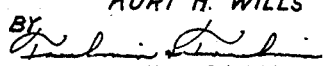
ATTORNEYS Patented July 16, 1940

2,208,319

UNITED STATES PATENT OFFICE 2,208,319

LATHE

Clifford A. Bickel and Kurt H. Wills, Sidney, Ohio, assignors to The Monarch Machine Tool Company, Sidney, Ohio, a corporation of Ohio Application August 26, 1936, Serial No. 97,959

39 Claims. (Cl. 82—17)

This invention relates to lathes and in particular to lathes for turning work pieces other than those of circular cross-section, such as regular polygons, together with methods for forming such work pieces.

One object of this invention is to provide a lathe having elements associated therewith for causing the cutting tool to pursue a path in related timing with the rotation of the work piece so that the work piece may be turned to a shape having a cross section other than circular, such as a regular polygon.

Another object is to provide a lathe having a carriage with a transverse slide and a cutting tool mounted thereon, with mechanism correlated with the shaft on which the work piece is rotated in such a manner that the cutting tool moves back and forth in a predetermined relationship with the rotation of the work piece, with the result that the work piece is formed with an other-than-circular cross section such as that of a regular polygon.

Another object is to provide a lathe having a carriage and mechanism associated therewith for causing a cutting tool to follow a predetermined path correlated with the rotation of the work piece shaft in such a manner that fluted portions are formed upon the work piece.

Another object is to provide mechanism associated with the transverse slide on a lathe and correlated with a work piece rotating spindle in such a manner as to cause the tool to turn, bore, face or flute shapes of work pieces other than round, such as ovals, triangles, squares and other polygonal shapes, either flat, concave or convex.

Another object is to provide mechanism of the type described above associated with a taper attachment in such a manner as to cause the cutting tool to cut a longitudinally-tapering work piece while forming its cross section into an other-than-circular cross section, such as that of an oval, a triangle, a square, a hexagon, etc., either flat, concave or convex.

Another object is to provide a lathe having a cam of a special configuration according to the nature of the work piece to be cut, this cam being rotated at a speed correlated with the work piece rotating shaft, this cam being connected to cause the cutting tool to move to and fro along a predetermined path and in timed relationship with the work piece rotating spindle in such a manner than an other-than-circular shape is cut upon the work piece.

Another object is to provide mechanism of the above described nature associated with a compensating arrangement whereby the cutting tool is given a compensated motion to allow for the motion of the tool in turning tapered work pieces.

Another object is to provide a method of forming work pieces with other-than-circular cross sections consisting in moving a cutting tool along a path correlated with the rotation of the work piece rotating shaft in such a manner that the work piece is turned to a non-circular cross section such as that of an oval, a triangle, a square, a hexagon, and shapes with a larger number of sides, either flat, concave or convex.

In this invention a cam is provided which is rotated at a predetermined ratio with respect to the rotation of the work piece so that for each rotation of the work piece, the cam rotates a number of revolutions equal to the number of configurations to be placed on the sides of the work piece. This cam reciprocates a cutting tool through a cycle of movements in and out towards the axis of the work piece in order to cut the desired configuration as determined by the cam on the side of the work piece. The length of this reciprocation must be adjusted within the maximum provided for by the cam in order to reduce the length of the stroke of the cutting tool when a taper is also being cut upon the work piece by reason of using a taper attachment.

This stroke compensator controls the reduction of the stroke of the tool to reduce the size of the face being cut by the tool, as the size of that face will be reduced as the work piece is tapered from a large end to a small end. The angularity of the taper is taken care of by the adjustment of the taper attachment, which determines the distance the tool will assume from the longitudinal axis of the work piece. Consequently there is provided a cam determining the contour of the surface, and the number of such contours is determined by the ratio of the cam revolutions to the work piece revolution. This cam determines the maximum stroke or length of reciprocation of the cutting tool transversely of the work piece axis.

Referring to the drawings:

Figure 2 is a top plan view of the lathe and mechanism shown in Figure 1.

Figure 3 is a top plan view of the rearward portion of a taper attachment for use in turning tapered work pieces as attached at the back of the lathe.

Figure 4 is a vertical section through the cross feed screw of the carriage and taper attachment of the lathe shown in Figures 1 to 3 inclusive.

Figure 5 is a schematic diagram showing the motions of the various elements involved in the machine and method of this invention.

Figure 6 is a diagrammatic plan view of the principal elements of the mechanism of this invention for performing the motions shown in Figure 5.

Figure 7 is a diagrammatic exploded perspective view of the principal elements shown in Figure 6 and other figures for bringing about the motions shown in Figure 5.

Figure 8 is a side elevation of the headstock of the lathe partly broken away to show the power take-off mechanism for operating the non-circular work piece turning mechanism of this invention.

Figure 9 is a cross section through the headstock along the line 9—9 of Figure 8.

Figure 10 is a section along the line 10—10 in Figure 9 showing the continuation of the power take-off and change-speed mechanism for operating the non-circular work piece turning mechanism.

Figure 11 is a layout section along the staggered line 11—11 in Figure 9 showing the gears laid out with their axes in a single plane.

Figure 12 is a top plan view partly broken away of the operating cam assembly and its associated parts.

Figure 13 is a front elevation partly in section of the mechanism shown in Figure 12.

Figure 14 is a vertical section along the line 14—14 in Figure 12.

Figure 15 is a side elevation partly in section of the compound rest and tool post swivel with the associated mechanism for moving the tool to cut work pieces of other-than-circular cross section and connected to the mechanism shown in Figure 14.

Figure 16 is a vertical section along the line 16—16 in Figure 15 showing the tool post slide and swivel construction.

Figure 17 is a top plan partly in section of the carriage mechanism embodying the non-circular work piece turning arrangement showing the compensating mechanism employed in turning tapered work pieces.

Figure 18 is an enlarged detail section along the line 18—18 in Figure 17.

Figure 21 is a diagrammatic view showing a work piece of square cross section and the development of the cam configuration for turning such a work piece.

Figure 22 is a diagrammatic view of the cam resulting from the development of Figure 21.

Figure 23 is a diagrammatic view showing a work piece having a cross section of an eight-pointed star and the development of the cam configuration for turning such a work piece.

Figure 24 is a diagrammatic view of the cam resulting from the development of Figure 23.

Figure 25 is a diagrammatic view showing a work piece having a cross section with six sides separated by fluted portions and the development of the cam configuration for turning such a work piece.

Figure 26 is a diagrammatic view of the cam resulting from the development of Figure 25.

Figures 27 to 31 inclusive are views of work pieces of differing cross sections capable of being produced by the lathe of this invention.

General construction

In general the lathe and associated mechanism of this invention consists of a cam of special configuration as determined from the cross section of the particular work piece to be cut. This cam is driven in timed relationship with the work piece rotating spindle and operates a series of levers and slides to convey the motion derived from the cam to the cutting tool. A compensating arrangement is interposed in the mechanism having the effect of altering the feeding action of the cutting tool to compensate for the taper feed employed in turning tapered work pieces.

In general the cam shaft is rotated a multiple number of times for every rotation of the work piece rotating shaft. For example, in turning a work piece of square cross section, one-fourth of the square is developed into a full revolution of the cam so that the cam is rotated four times to one revolution of the work piece. With an eight-sided work piece, the portion thereof from which the cam is developed constitutes one-eighth of the work piece and the cam will be revolved eight times to one revolution of the work piece. Other cams for turning other shapes follow similar principles.

The device consists primarily of a system including a cam, gearing, and lever arms with index plates and dials for properly setting the device. Mechanism is associated with the headstock of the lathe for providing the multiplicity of speeds necessary for rotating the cam in relationship to the work piece shaft. The non-circular work piece turning mechanism itself is mounted upon the carriage bridge in the same manner as the compound rest and the drive is taken from the headstock mechanism through an auxiliary shaft and universal joints. The device may be used in connection with a standard lathe or with a lathe having a taper attachment for turning tapered work pieces. In this manner and with a cam of particular design for each shape, it is possible to turn, bore, face or flute other-than-circular forms of work pieces, such as those of oval, triangular, square, hexagonal, octagonal, etc. cross sections, either flat, concave or convex. With the arrangement disclosed in the present drawings any shape can be turned up to a work piece having three hundred sides.

The headstock gearing for the power take-off is so arranged that it is possible to vary the gearing combinations in the manner necessary to provide the necessary number of rotations of the cam with respect to the work piece rotating spindle.

Figure 1:
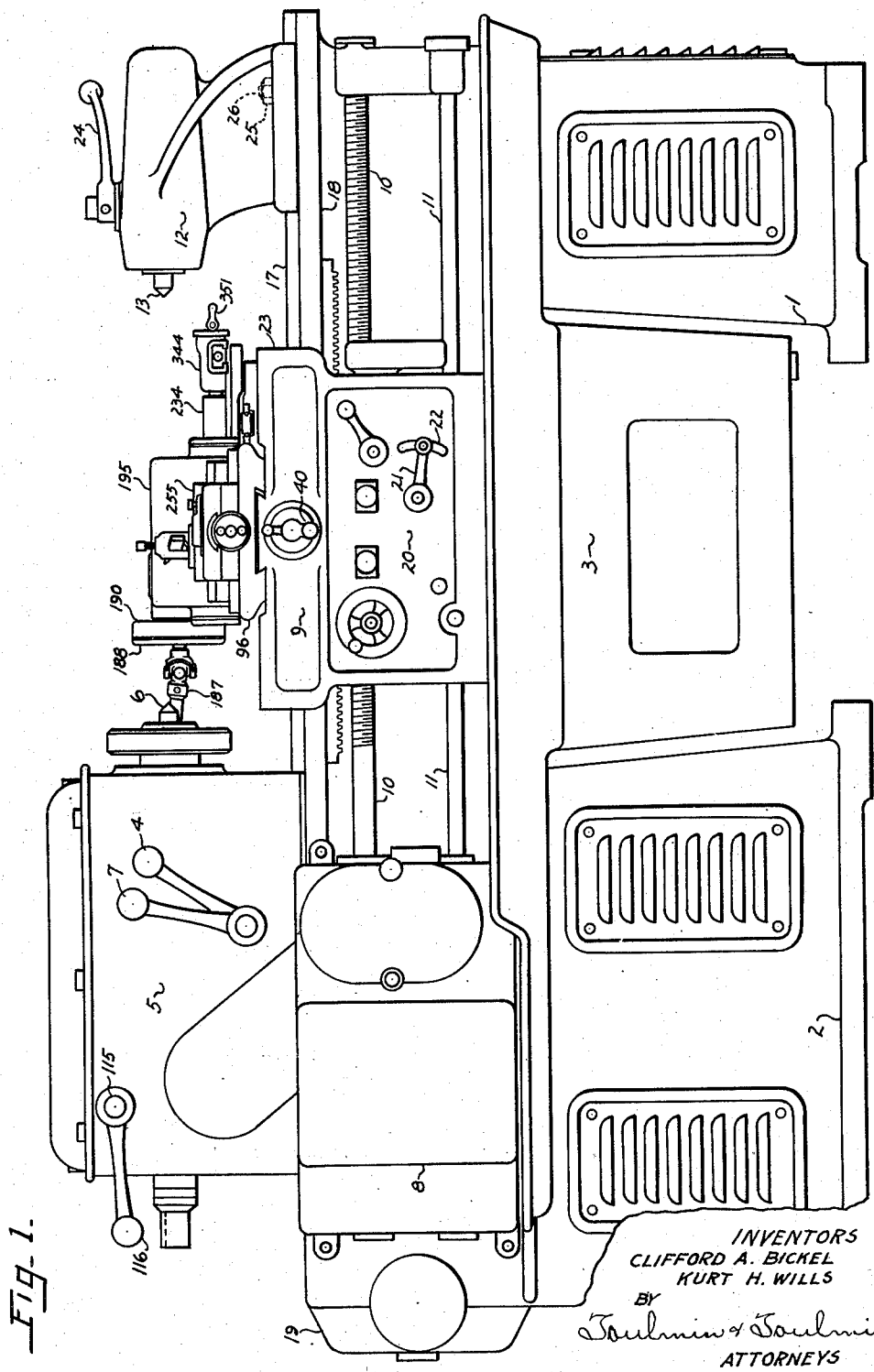
Figure 1 is a front elevation of a lathe embodying the non-circular work piece turning mechanism of the present invention.
Figure 19:
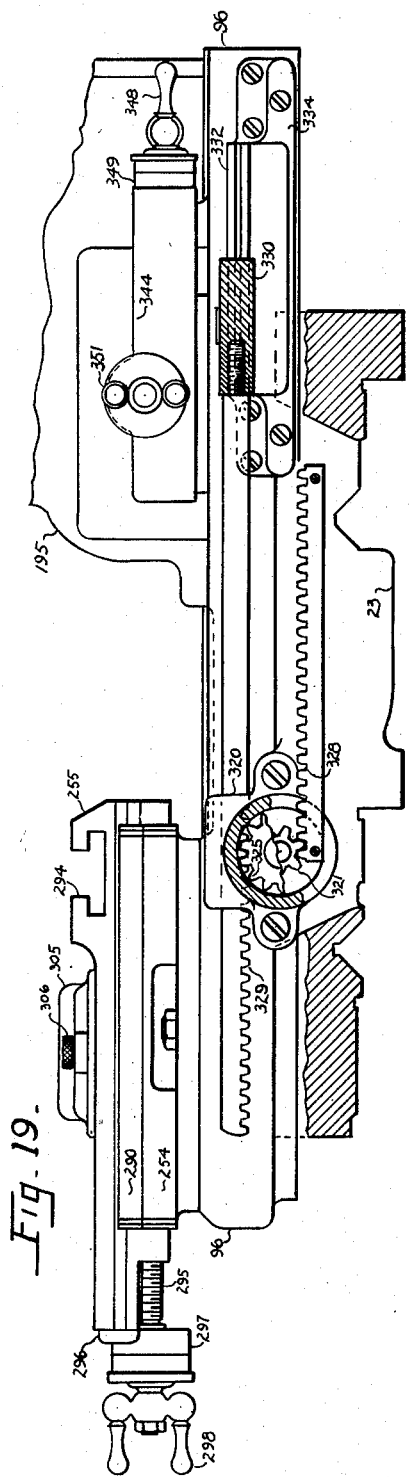
Figure 19 is a vertical section along the line 19—19 in Figure 17.

It will be understood that the non-circular work piece turning arrangement of the present invention is not necessarily confined for use with the lathe shown in Figures 1 and 2, but may be applied to any standard lathe or to special lathes with suitable modifications. The lathe shown in Figures 1 and 2 is disclosed merely as an example of a particular installation and for clarifying the relationship of the arrangement itself with the machine with which it is used.

General lathe construction

Referring to the drawings in detail, Figures 1 and 2 show a typical lathe with which the non-circular work piece turning arrangement of this invention may be used and with which the method of this invention may be carried out.

In Figure 1 there is shown a lathe having hollow base legs 1 and 2 supporting the intermediate pan 3 and having louvers for ventilation. The lathe is provided with a headstock generally designated 5 having a headstock center or live center 6. The headstock 5 is provided with change-speed gearing actuated by the headstock gear shift levers 4 and 7. The lathe is likewise provided with a gear box generally designated 8, the mechanism of which communicates with the lathe carriage generally designated 9 through the lead screw 10 and the feed rod 11. Opposed to the headstock or live center 6 is a tailstock generally designated 12 having a tailstock center or dead center 13. The lathe is likewise provided with a bed plate 18 having ribbed ways 17. The left hand end of the machine is provided with a clutch contained in the clutch guard 19.

The mechanism by which the power is communicated from a motor mounted within the base leg 2 to the headstock center 6 is not a subject of the present invention and may consist of any appropriate mechanism such as is known to those skilled in the art. Similarly, the mechanism in the gear box 8 for operating the lead screw 10 and feed rod 11 may be of conventional design and does not form a subject of the present invention.

The carriage 9 is moved to and fro along the ways 17 by means of mechanism contained in the apron 20 thereof, the direction of motion being controlled by the lever 21 operating in the arcuate groove 22. The mechanism contained within the apron 20 is likewise of a conventional design and does not form a subject of the present invention. The details of the mechanism in the carriage 9 and the non-circular work piece turning arrangement associated therewith will be discussed later. This mechanism is mounted upon the carriage base 23, from which the apron 20 depends.

The tailstock 12 is likewise mounted on the ribbed ways 17 and its dead center 13 may be moved to and fro by turning the clamping handle 24, which operates a pinion engaging a rack (not shown) for moving the dead center 13 in an axial direction. The use of the same handle 24 serves to lock the rack in a fixed position and consequently to clamp the dead center 13 in an immovable location. The tailstock 12 itself may be adjusted bodily along the ways 17 of the lathe bed 18 by loosening the nuts 25 which tighten the clamping bolts 26 and device clamping the tailstock 12 to the lathe bed 18.

*Taper attachment and associated carriage mechanism*

The carriage base 23 (Figure 4) which reciprocates along the ribbed ways 17 of the lathe bed 18 is provided with a bushing 30 within which is rotatably mounted the sleeve 31 containing a bore 32 adapted to receive the end 33 of the cross feed screw generally designated 34. A key way 35 provides a driving connection between the sleeve 31 and the cross feed screw 34, yet permits the plain portion 33 thereof to move to and fro longitudinally within the bore 32 of the sleeve 31. A pinion 36 is associated with the sleeve 31. The key 38 associated with the sleeve 31 engages the key way 35 and forms a driving connection therebetween.

The pinion 36 meshes with a gear (not shown) which is rotated by the conventional mechanism contained in the carriage apron 20 and forming no part of the present invention. The sleeve 31 terminates in a shaft portion 39, to the outer end of which is secured the hand crank 40 as by the nut 41. Also secured to the shaft portion 39 is a disk 42 located against the collar 43 surrounding the sleeve 44 and having a cylindrical micrometer dial 45 associated therewith.

The inner end of the cross feed screw 34 is provided with a reduced diameter portion 50 surrounded by a bearing sleeve 51 supported by the member 52 between the thrust bearings 53 and 54, the whole being held in assembled condition by the nut 55 on the threaded end 56 of the cross feed screw portion 50. The member 52 is secured by the screws 57 to the taper operating bar 58. The latter is provided with a hole 59 through which passes the bolt 60, the end of which is secured within the threaded hole 61 in the swivel shoe 62. The screws 63 are provided for adjusting the clearance between the shoe 62 and the swivel 64 within which the shoe 62 slides between guide faces 65 forming ways therefor. The swivel 64 is provided with a vertical pivot stud 66 pivotally mounted within the bore 67 in the swivel slide 68, the latter having a dovetailed portion 69 arranged to slide within the ways 70 of the bracket 71. The bracket 71 is secured as by the bolts 72 to the base portion 23 of the lathe carriage 9.

Threaded into one end of the swivel slide 68 and locked thereto by the lock nut 73 is an anchor rod 74 (Figure 3) which terminates in a bore 75 in the bed clamp 76, the latter being clamped to the lathe bed 18 by bolts 77. The outer end of the anchor rod 74 is threaded as at 78 and carries lock nuts 79 by which it is anchored to the bed clamp 76. The swivel 64 is arranged to be pivotally adjustable around the stud 66 and for this purpose it is provided with arcuate ends 80 and 81. Beneath the arcuate end 80 is mounted a nut 82 through which passes the screw shaft 83 rotatably mounted in the swivel slide 68 and provided at one end with a retaining button 84 and at the other end with a hand wheel 85 for rotating the screw shaft 83.

The ends 80 and 81 of the swivel 64 are provided with elongated holes through which the clamping bolts 86 pass loosely. When these clamping bolts 86 are tightened they serve to clamp the swivel in any desired position of angularity. With these bolts 86 loosened, the hand wheel 85 may be turned to rotate the screw shaft 83 and thereby angularly adjust the swivel 64 around its pivot stud 66. This adjustment is indicated by an index pointer 87 on the end 80 of the swivel 64 on a double scale 88 which indicates the taper to be obtained, either in degrees or in inches per foot of length.

The outer end of the bar 58 passes through a slot 89 in the upper end of the auxiliary bracket 71a secured to the bracket 71 by the screws 71b. The slot 89 is provided with a retaining plate 90 secured thereto by the screws 91. The opposite end of the taper operating bar 58 is provided with an elongated slot 92, having slightly inclined side walls. Within this slot 92 is arranged a clamping member 93 with correspondingly inclined side walls and having a bolt 94 threaded therein. The bolt 94 passes through a hole 95 in the transverse slide 96 and is so arranged that when the bolt 94 is tightened, it draws the inclined side walls of the clamping member 93 with a wedge-like action into tight engagement with the inclined side walls of the bar 58 so as to lock the transverse slide 96 to the taper actuating bar 58, thereby making these two members temporarily a solid unit. When the bolt 94 is loosened, however, the clamping member 93 is released so that the transverse slide 96 may move relatively to the taper actuating bar 58.

Under the latter condition, the transverse slide 96 may be moved to and fro through the action of the cross feed screw 34 whose threads engage the cross feed nut 98 secured by the bolt 99 and screw 100 to the transverse slide 96. For straight turning the bolts 77 of the bed bracket 76 (Figure 3) are loosened so that the entire taper attachment moves to and fro with the carriage without relative motion between the various parts thereof.

For tapered turning, however, the bolts 77 are tightened to lock the bed clamp to the bed 18 of the lathe. The transverse slide 96 is moved to and fro under the influence of the cross feed screw 34 rotated by the hand wheel 40 so that the cutting tool can be positioned to the work and the bolt 94 is then tightened to lock the taper operating bar 58 rigidly to the transverse slide 96.

With the swivel 64 properly adjusted by the previously mentioned means to the desired angle, the longitudinal feeding mechanism of the carriage is brought into operation by rotating the feed rod 11 so that the carriage 9 moves along the lathe bed ways 17 and feeds the tool along the work. At the same time the shoe 62 moves along the angularly directed sides 65 of the swivel 64, thereby moving the transverse slide 96 through the intermediate agency of the taper operating bar 58. In this manner the taper attachment is caused to actuate the cutting tool mounted on the transverse slide 96 for cutting a tapered work piece.

It is, of course, understood that when the taper attachment is employed and the transverse slide 96 is locked to the taper operating bar 58, the pinion 36 for driving the cross feed screw 34 is de-clutched from the power mechanism and the end 33 of the cross feed screw telescopes axially within the sleeve 31 as the transverse slide 96 is moved transversely under the action of the taper actuating bar 58 and the shoe 62 sliding in the ways 65 of the swivel 64.

The transverse slide 96, as will hereinafter appear, supports much of the mechanism constituting the non-circular work piece turning arrangement, including the cutting tool by which the work piece is actually turned.

*Headstock power take-off and change-speed mechanism*

The headstock 5 (Figure 8) is provided with a housing 101 containing various change-speed gearing for imparting variable speeds to the rotatable head 102 containing the headstock center 6. This change-speed mechanism forms no part of the present invention and is of any conventional type known to those skilled in the art. The rotatable head 102 by which the rotating motion is applied to the work piece is mounted on the work spindle 103. The latter is journaled in anti-friction bearings 104 and is provided with a sleeve 105 from which is loosely mounted the spiral bevel gear 106, the latter being held in place by collars 107. On the hub of the spiral bevel gear 106 are clutch teeth 108 which engage corresponding teeth 109 on the sliding clutch member 110. The latter is keyed as at 111 to the work spindle 103 and is provided with an annular groove 112 within which operate the shifting pins 113 mounted upon the shifting yoke 114. The shifting yoke 114 is mounted on the shaft 115, the outer end of which carries the clutch shifting lever 116. By moving the lever 116, the clutch member 110 may be disengaged from the bevel gear 106. The work spindle 103 is provided with a gear 117 keyed thereto and a pinion 118 likewise keyed thereto for purposes not connected with the present invention. Lock nuts 119 are mounted upon the outer end of the work spindle 103 and hold the various elements thereof in assembled condition. A packing 120 prevents the escape of oil along the work spindle 103.

Meshing with the bevel gear 106 is the pinion portion 121 of the pinion shaft 122, the latter being journaled at its opposite ends in anti-friction bearings 123 and 124 (Figures 8 and 9). A sleeve 125 mounted upon the pinion shaft 122 serves to space the spiral bevel gear 126 keyed as at 127 to the pinion shaft 122. A nut 128 holds the spiral bevel gear 126 in assembly with the spacing sleeve 125, where as a nut 129 retains the anti-friction bearing 124 in its proper position relative to the pinion shaft 122.

The spiral bevel gear 126 meshes with and drives the pinion portion 130 of the pinion shaft 131, this being supported at its opposite ends by the anti-friction bearings 132 and 133 in the headstock housing 101. The pinion shaft 131 carries a spacing sleeve 134 for properly spacing the anti-friction bearings 132 apart from each other along the pinion shaft 131. The outer end of the pinion shaft 131 carries a collar 135 keyed thereto and engaged by a packing 136 to prevent the escape of lubricant. Also keyed to the outer end of the pinion shaft 131 is a bevel gear 137 which is held in place by the nut 138 threaded on to the end of the pinion shaft 131.

The spacing sleeve 134 is spaced apart from the pinion shaft 131 and is locked to the headstock housing 101 by the screw 139. The headstock itself is secured to the lathe bed 18 by the clamping bar 140 anchored thereto by the clamping bolts 141 (Figure 9). The lathe bed 18 is also supports a bracket 142 secured thereto by the belts 143 having its upper end bolted as at 144 to the bottom of the headstock 5, thereby providing additional support.

Meshing with the bevel gear 137 (Figure 10) is a bevel pinion 145 keyed to the shaft 146 rotatably mounted in the anti-friction bearings 147 and 148 mounted in the change gear housing which is bolted to the rear of the headstock 5. Keyed to the outer end of the shaft 146 is a pinion 149 secured thereto by the nut 150 threaded upon the end of the shaft 146. Meshing with the pinion 149 is a compound idler gear 151 which carries a gear 152 keyed thereto (Figures 9 and 11). The compound idler gear 151 is mounted upon anti-friction bearings 153 which in turn are supported by the stud shaft 154 mounted in the bore 155 of the change-gear housing 156. The latter is bolted by the bolts 157 to the rear of the headstock 5.

Meshing with the gear 152 is an idler gear 158 supported by the anti-friction bearings 159 upon the sleeve 160 surrounding the stud shaft 161 mounted in the quadrant 162. The quadrant 162 at its opposite ends is provided with the bolts 163 (Figure 9) which pass through the arcuate slots 164 and 165 respectively. The quadrant 162 is pivoted around the outer sleeve 166 (Figure 11) located in the change-gear-housing 156. Meshing with the idler gear 158 is a compound idler gear 167, to which is keyed the compound gear 168, the whole being mounted upon the stud shaft 169 supported by the quadrant 162.

Anti-friction bearings 170 are arranged between the hub of the idler gear 167 and the stud shaft 169. The idler gear 168 meshes with a pinion 171 keyed to the inner sleeve 172 and held in place thereon by the nut 173. The inner sleeve 172 is mounted on anti-friction bearings 174 and 175 (Figures 10 and 11), these being in turn supported by the outer sleeve 166, the latter being anchored in the bore 177 to the quadrant 162 by the screw 178. The gland 179 additionally serves as a locating collar for the quadrant 162.

The inner sleeve 172 is arranged to receive the telescoping drive shaft 180 having a key way 181 engaged by the keys 182 mounted in the inner sleeve 172. In this manner the telescoping drive shaft 180 may move axially into and out of the inner sleeve 172 and yet constantly receive a driving connection therefrom. Mounted on the telescoping drive shaft 180 is a universal joint 183. Connected to the universal joint 183 is the intermediate drive shaft 184 which serves to drive the non-circular work piece turning mechanism mounted on the carriage 9 in a manner hereinafter described.

The quadrant 162 (Fig. 9) is provided with a slot 185 and the change-gear housing 156 with a slot 186 for adjustably receiving the stud shafts supporting the gears 158, 168 and 151 respectively. By interchanging these gears or substituting gears with different numbers of teeth therefor, it is possible to vary the speed of the intermediate shaft 184 between wide limits relatively to the speed of the work spindle 103 (Fig. 8). In this manner the cam hereinafter described for actuating the work piece is provided with a drive which rotates it a multiple number of revolutions for every revolution of the work spindle 103. By reference to a table giving the various gear combinations and speeds obtainable thereby, suitable gears may be set up in the gear train located in the quadrant 162 and change-gear housing 156 so as to drive the intermediate shaft 184 in any relationship relatively to the work spindle 131, depending upon the nature of the work piece.

The opposite end of the intermediate shaft 184 (Figure 12) is connected to a universal joint 187 which is fastened to the timing plate 188 by the pin 189. The timing plate 188 is locked to the cam shaft plate 190 by the T-bolts 191. The cam shaft plate 190 is keyed to the cam shaft 192 and locked in position by the nut 193. The cam shaft 192 is mounted on anti-friction bearings 194 which are supported in the cam housing 195 bolted to the transverse slide 96 by the screws 196 and 197. The cam shaft 192 is held in position by the cam shaft plate 190 and the nut 193. The gland 198 serves as an oil seal. Mounted on the cam shaft 192, having a cam carrier 199, is a cam 200 secured thereto by the pin 201 and clamping screws 202 (Figure 13). Bolted to the cam housing 195 are ball bearing guides 203 having balls 204 arranged in grooves therein for supporting the cam roller slide 205. Mounted on the cam roller slide 205 is a bracket 206 which is locked to the cam roller slide by bolts 207 passing through the slots 207a.

The bracket 206 is provided with anti-friction bearings 208 which rotatably support the cam roller stud 209 having the cam roller 210 on one end thereof. The collar 211 pinned thereto properly positions the cam roller stud 209 (Figure 12).

Bolted to one end of the cam roller slide 205 is the arm 212 which rotatably supports the upper swivel 213 which rotates in anti-friction bearings 214 held in position by the cap 215. Mounted on the upper swivel 213 are four ball bearing assemblies 216 (Figs. 12, 13 and 14) which are held in position by studs 217. These studs 217 are locked to the swivel by means of screws 218, one stud being straight and the other three studs being eccentric so that the clearances of the bearings relatively to the swinging stroke arm 219 can be properly adjusted.

A spring 220 located in the cam housing 195 urges the cam roller slide 205 and its roller 210 against the internal cam 200. An adjusting screw 221 provides for the proper adjustment of the tension of the spring 220. The ball bearing assemblies 216 slidably engage the upper portions of the swinging stroke adjusting arm 219 which has a stem 222 supported in anti-friction bearings 223 (Figure 12) in the cam housing 195. The anti-friction bearings 223 are held in position by the spacer 224 (Figure 14) and lock nut 225 upon the end of the stem, the whole being supported within the bore 226 of the cam housing 195, and covered by the cover plate 227.

Engaging the lower portion of the stroke adjusting arm 219 are four ball bearing assemblies 228 similar in construction to the ball bearing assemblies 216 and similarly engaging the stroke adjusting arm 219 in such a manner as to slide along the arm. The ball bearing assemblies 228 are mounted upon the studs 229 secured in the lower swivel 230 (Figures 13 and 14) and locked in place by screws 231 in a similar manner to screws 218. One of the studs 229 is straight and the other three are eccentric so that proper clearances may be adjusted and maintained between the bearing assemblies and the stroke adjusting arm 219. The lower swivel 230 is rotatably mounted in anti-friction bearings 232 mounted in the upper stroke reciprocating slide 233. The slide 233 is slidably mounted in the hand compensating slide 234 by means of the bearing balls 235 sliding in grooves therebetween. The hand compensating slide 234 is provided with guides 236 adapted to receive these balls 235 and adjustable by the adjustable screw 237. (Figure 14.)

The lower part of the stroke reciprocating slide 233 passes through a slot 238 in the power stroke compensating slide 239 and at its lower end supports four anti-friction bearing assemblies 240 mounted upon studs 241, one of these studs being straight and the other eccentric to provide proper adjustment of their clearances as previously described in connection with the bearing assemblies 216 and 228. The anti-friction bearing assemblies 240 are arranged to slide in the groove 242 of the shoe 243 which is bolted to the lower stroke reciprocating slide 244 (Figures 13 and 14), which is slidably supported on balls 245 which roll in grooved guides 246 located on the transverse slide 96, screws 247 being provided for the adjustment thereof. Bolted to the bottom of the lower stroke reciprocating slide 244 is the reciprocating bar 248 (Figure 14), which transmits the motion of the cam to the compound rest and cutting tool as hereinafter described. The hand compensating slide 234 and power compensating slide 239 are located in the cam housing 195 and are supported on each end of the cam housing by anti-friction bearings 249 and 250. These bearing assemblies engage the housing 195 and are mounted upon studs 251, one stud being straight and the others being eccentric, in such a manner as to provide a clearance adjustment in the way previously described.

The hand compensating slide 234 and the power compensating slide 239 likewise rest upon four anti-friction bearings, 252, which are mounted in the cam housing 195 by studs 253, one of these studs being straight and the others being eccentric for an adjustment of the clearance as previously described.

*Compound rest and tool assembly*

The compound rest assembly (Figures 15, 16 and 17) consists of a swivel 254 (Figure 15), and having a tool adjusting slide 255 arranged therein. The tool adjusting slide 255 is adapted to be swiveled at any angle, depending upon the work to be machined. The reciprocating bar 248 transmits the cam motion through the rod 256 attached thereto, the opposite end of this rod being secured in the rod slide 257. The rod 256 is reciprocably supported as at 258 in the transverse slide 96. The rod slide 257 is provided with a spring 260 having an adjusting screw 261 for urging it and the parts associated therewith toward the right as shown in Figure 15. The spring 260 thus acts in cooperation with the spring 220 (Fig. 13) to urge the cam roller 210 against the internal cam 200. The rod slide 257 is supported upon bearing balls 262 (Figure 16) which engage grooved guides 263 and 264 bolted to the transverse slide 96. Mounted on the rod slide 257 is a shoe 265 supported by the anti-friction bearings 266 on the stud 267 (Figure 15).

Arranged to engage this shoe 265 is the lower reciprocating arm 268 supported on anti-friction bearings 269 (Figure 16) which surround the stud 270 mounted in the transverse slide 96. The lower reciprocating arm 268 carries anti-friction bearing asemblies 271 (Figure 15) supported on studs 272 and adapted to roll on the shoe 265. One of these studs 272 is straight and the other three are eccentric in the manner previously described for adjusting the clearances.

An upper reciprocating arm 273 (Figure 16) is frictionally associated with the lower reciprocating arm 268. To this end the lower reciprocating arm is provided with a conical portion 274 frictionally engaged by the internal conical portion 275 of the upper reciprocating arm 273. The upper reciprocating arm above its internal conical portion 275 is provided with anti-friction bearings 276, within which is the threaded stud 277 having a threaded sleeve 278. The sleeve 278 is locked in position by the hexagonal collar 279 and set screw 280. The threaded stud 277 is surmounted by a nut 281 which serves as a lock nut.

The upper reciprocating arm 273 is provided with four anti-friction bearing assemblies 282 which roll on the shoe 283 and are locked to the upper reciprocating arm 273 in the same manner as the bearings in the lower reciprocating arm 268. The shoe 283 is mounted on anti-friction bearings 284 surrounding the stud 285 (Figure 16). The latter is mounted in the upper reciprocating slide 286, which is grooved and slidably supported by the bearing balls 287 which roll in grooved guides 288 bolted to the swivel 254. The balls 204, 216, 235, 245, 262 and 287 thus provide an anti-friction bearing support for their associated slides, which is essential for the effective operation of the invention.

Mounted on the upper reciprocating slide 286 is the tool slide 255, which is guided by gibs 290 and 291 attached to the swivel 254. After the proper tool setting has been made, the tool slide 255 is firmly bolted to the upper reciprocating slide 286 by tightening the nut 292 upon the stud 293. The tool slide 255 (Figure 15) carries a T-slot 294 for holding the tool holder and tool, and is also provided with the micrometer adjusting screw 295 mounted in the bracket 296 and having a micrometer dial 297 and hand crank 298 associated therewith. The micrometer screw 295 actuates a nut 299, which is mounted in the upper reciprocating slide 286. The swivel 254 and tool slide 255 may be set at any angle by loosening the swivel clamping bolts 289 and also loosening the nut 281 on the stud 277, which permits the upper reciprocating arm 273 to be lifted away from the conical portion of the lower reciprocating arm 268, leaving the swivel 254 and tool slide 255 free to be rotated to any desired angle.

*Compensating mechanism assembly*

Mounted on the transverse slide 96 is a bracket 320 which houses the pinion 321 keyed to the tapered sleeve 322 (Figures 17 and 18). The tapered sleeve 322 is supported on anti-friction bearings 323. Mounted on the tapered sleeve 322 is an internally tapered hub 324 carrying a gear 325 held thereagainst by the nut 326. By loosening the nut 326 the gear 325 may be rotated relatively to the shaft 327 carrying the pinion 321. Mounted on the lathe carriage 23 is a rack 328 which meshes with the pinion 321. Supported on the bracket 320 is a rack 329 which meshes with the gear 325. Attached to one end of the rack 329 is the slide 330 slidably supported on the balls 331 which roll in guides 332 and 333. The guides 332 and 333 are bolted to the bracket 334 bolted to the transverse slide 96.

Figure 20:
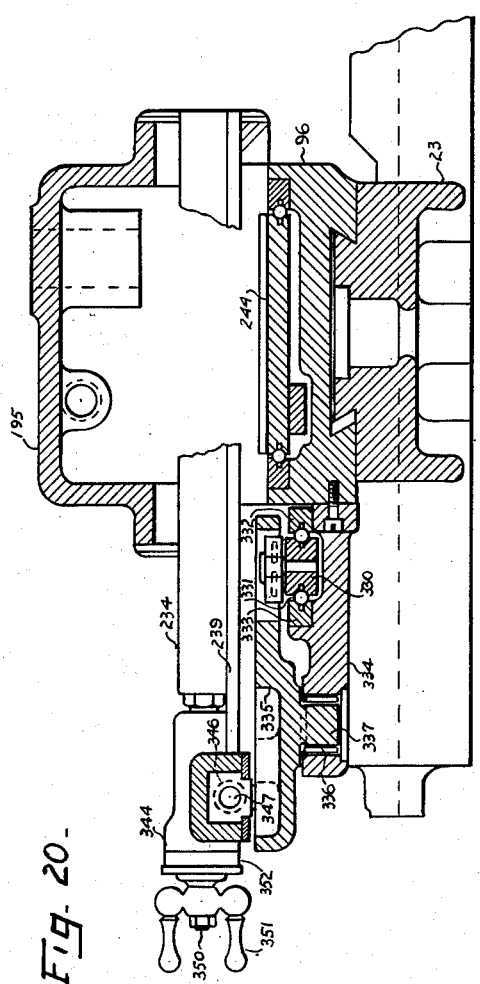
Figure 20 is a vertical section along the oblique line 20—20 in Figure 17.

Supported on the bracket 334 is a crank arm 335 supported on a stud 337 which is mounted in anti-friction bearings 336 (Figures 17 and 20) and which is attached to the slide 330. The other end of the crank arm 335 is provided with a milled slot 338 in which anti-friction bearing assemblies 339 slidably roll (Figure 18). The anti-friction assemblies 339 are held (Figure 18) in the shoe 330a by studs 340, three of which are eccentric and the remaining one straight to provide a proper clearance adjustment. The shoe 330a is mounted upon the slide 341 by means of the end cap 342 and is supported relatively thereto upon the anti-friction bearing 343 (Figure 18).

The slide 341 is located in the bracket 344 (Figure 17) which in turn is bolted to the power compensating slide 239 and held in place by gibs 345. The slide 341 is provided with a threaded nut 346 actuated by the screw 347 which is actuated by the hand crank 348 having the micrometer dial 349 associated therewith. The hand compensating slide 234 is moved relatively to the power stroke compensating slide 239 by means of a screw 350 having a hand crank 351 and micrometer dial 352. This compensating attachment is employed when boring or turning a tapered attachment or shape or in machining fluting on the face of a work piece where the diameter is constantly changing. An example of such a work piece is square with tapered sides. A square work piece of a certain diameter requires a different stroke to produce a flat side and as the diameter changes, the stroke of the cutting tool must be increased or decreased accordingly. This action is accomplished by the compensating attachment.

Operation

For convenience of description, it will be assumed that a work piece having a square cross section is to be turned. The cam for the square work piece is developed from a quarter of the square, as shown in Figures 21 and 22 and described elsewhere. This cam, which is the internal cam 200 shown for this example in Figure 22, is mounted upon the cam carrier 199. Since the cam accomplishes the motion of the tool solely for a quarter of the work piece, it is obvious that the cam 200 must be rotated four times the speed of the work spindle 103. The gearing shown in the right hand side of Figure 9 is selected and adjusted to give such a speed. Assuming that power is applied to the work spindle 103, this power is transmitted through the gear train associated with the headstock 5 and shown in Figure 11 so that it drives the intermediate shaft 184 and the cam shaft 192 rotating the cam 200. The motion set up by this cam 200 is transmitted to the cam roller 210 and thence to the cam slide 205 and arm 212 to the swivel 213, the bearing assemblies 216 of which engage the upper portion of the stroke reciprocating arm 219. This action causes the latter to swing about its stem (Figure 14) as an axis, imparting this swinging motion to the lower swivel.

As the stroke reciprocating arm 219 thus swings to and fro, it engages the stroke reciprocating slide 230 and causes it to swing to and fro in its guideways. This motion is, in turn, transmitted by the ball bearing assemblies 240 to the shoe 243 mounted on the lower stroke reciprocating slide 244. As the latter reciprocates under this action, it moves the bar 248 and rod 256, attached thereto, thereby moving the slide 257 and the shoe 265 mounted thereon. This action moves the lower reciprocating arm 268 and the upper reciprocating arm 273, frictionally engaging it. The motion of the upper reciprocating arm 273 about the axis of the stud 277 causes the upper reciprocating slide 286 to reciprocate, carrying with it the tool slide 255. In this manner the tool is caused to execute a motion which is transmitted to it from the cam 200.

The compensating mechanism shown in Figures 17 to 20, inclusive, comes into operation when a tapered work piece is to be turned or where fluting is to be formed on the face of the work piece. In either case, the diameter of the work piece is constantly changing. In the case of a square with tapered sides, for example, the changing diameter requires an increase or decrease of the stroke and this is accomplished by the compensating arrangement.

Assuming, for convenience, that the operator is boring a square with tapered sides, he selects the proper cam and times the cam shaft for four revolutions. He then tightens the nut 326 (Figure 17), locking the gears 321 and 325 together. After this he sets the slide 344 for the proper stroke, and the hand-adjusting slide 234 for the given stroke. The taper attachment shown in Figures 3 and 4 is set at the required angle, in accordance with the description previously given. The transverse slide 96 is then started on its feeding motion as the carriage moves the transverse slide 96 feeding inwardly in response to the action of the taper attachment. This causes the pinion 321 to revolve by reason of its engagement with the stationary rack 328 (Figure 17), thereby revolving the gear 325 and reciprocating the rack 329. As the ratio between the two gears 321 and 325 is two to one, the rack 329 will move twice as fast as the transverse slide 96. As the rack 329 and the slide 330 (Figure 20) move, the crank arm 335 starts to rotate about its axis, causing the power stroke compensating slide 239 and hand compensating slide 234 to move inwardly. This action causes the stroke reciprocating slide 233 to move toward the center of the stem 222, thereby transmitting its force on a reduced radius along the stroke arm 219.

The upper stroke reciprocating slide 233 carries the bearing assemblies 242 which roll in the shoe 243 attached to the lower stroke reciprocating slide 244. As the stroke arm 219 moves through a given arc, depending upon the particular cam used, and if the slide 239 is directly under the arm 212 which supports the upper swivel 213, the movement transmitted to the tool slide 255 will be the same. If, however, the slide 239 is moved toward the center of the stem 222 of the stroke arm 219, the stroke transmitted to the tool slide 255 and to the tool will be correspondingly less due to the action of the compensating mechanism of Figures 17 to 20, inclusive.

Thus, by this compensating arrangement a tapered work piece is properly machined because the stroke of the tool slide 255 is automatically changed as the taper changes upon the work piece. This taper, it will be recalled, is governed by the taper attachment mounted upon the rear end of the carriage 9. Depending upon the particular cam used, therefore, the non-circular work piece turning arrangement of the present invention can be employed to machine a widely varying number and variety of work pieces, either straight or tapered, and having flat, convex or concave sides.

Cam preparation

Figures 21 to 26, inclusive, show various forms of work-pieces and the cams for machining these work-pieces in the machine of this invention. Figure 21 shows a four-sided work-piece 302, a quarter portion 302a of which is developed into 360 degrees in making the cam 200. In machining the work-piece 302 the tool will follow along its peripheral line 302b. When the quarter portion 302a of the square work-piece 302 is developed into 360 degrees in the cam 200, as shown in Figures 21 and 22, and the cam roller 210 is of a given diameter, as shown in Figure 22, the configuration of the cam will be as shown on the line 301 of the cam, and the tool line 302b is developed as shown on the cam follower path 300. In machining the square work-piece 302, therefore, the cam 200 will rotate four times to one revolution of the work-piece 302, as previously described.

The cam 200 may be made in an alternate manner by using the machine of the present invention in a reverse action. For this purpose the cam roller 210 is replaced by a milling machine cutter of equal diameter. By using the tool as a tracer against the work-piece 302 and revolving the latter slowly, the tool movement will be transferred in a reverse direction through the various slides and lever arms previously described, to the cam roller slide 205 which carries the motor-driven milling cutter. The latter will then mill a cam path in the cam equivalent to the tool travel of the tool against the work-piece 302.

In Figures 23 and 24 are shown an eight-sided work-piece 303 and the cam developed therefrom. In developing this cam an eighth portion 303a of the work-piece 303 is employed and developed in a manner analogous to that described and shown in connection with Figures 21 and 22. The cam as shown in Figure 24 will rotate eight times to one revolution of the work-piece 303.

In Figures 25 and 26 are shown a six-sided fluted work-piece 304 and the cam developed therefrom. In a manner analogous to that previously described in connection with Figures 21 to 24, a sixth portion 304a of the work-piece is developed to form the cam. The latter will then rotate six times to one revolution of the work-piece 304. The dotted line in Figures 22, 24 and 26 indicates the path of the axis of rotation of the cam roller 210 relatively to the cam surface against which it operates. Access to the adjustment nut 281 is obtained by loosening the screw 306 (Figure 16) and lifting the hinged dust cover secured to the tool adjusting slide 255.

It will be understood that we desire to comprehend within our invention such modifications as come within the scope of the claims and the invention.

Having thus fully described our invention, what we claim as new and desire to secure by Letters Patent, is:

1. In combination, means for rotating a work piece at a predetermined speed, a cutting tool, a cam, means regulated thereby for moving said cutting tool with respect to the work piece through a predetermined number of cyclic in and out movements to impart to the surface of said work piece a number of contoured surfaces of similar character to that of the cam; means for regulating the relative number of cyclic movements of said cutting tool according to each revolution of said work piece, a taper attachment means adapted to regulate the movement of said cutting tool from end to end of said work piece in order to impart a predetermined longitudinal configuration to said work piece, and a stroke compensator for said tool adapted to reduce the length of the stroke of said cutting tool in each cyclic movement from the maximum stroke as established by said cam in order to reduce the size of each contoured face cut on said work piece so that the size thereof will be automatically adjusted according to the taper cut on the work piece.

2. In combination, means for rotating a work piece, a carriage, a tool slide thereon carrying the cutting tool, a taper attachment on said carriage, means to reciprocate said tool slide a predetermined number of reciprocations according to each revolution of said work piece, a contour cam rotating in synchronism with the reciprocations of said cutting tool and controlling the movement of said cutting tool so as to reproduce similar contoured faces on said work piece; and means to compensate said inward and outward movements of said cutting tool according to the difference in diameter of the work piece as cut depending upon the adjustment of said taper attachment.

3. In combination, means for rotating a work piece, a cutting tool, a cam and cam slide, a lever reciprocated thereby about a fixed pivot, a pitman adjustably positioned on said lever, a cutting tool actuated in and out with respect to the work piece by said pitman, means to regulate the number of said inward and outward cyclic movements of said cutting tool according to the number of rotations of the work piece, means to bodily move said cutting tool laterally of said work piece and at a predetermined angularity with respect to the longitudinal axis of the work piece; and means to compensate the extent of the cyclic inward and outward movements of said cutting tool according to its longitudinal angular position with respect to the longitudinal axis of the work piece.

4. In combination, in a lathe, of means for rotating a work piece, a cutting tool, means of supporting said cutting tool for in and out and longitudinal movement of the work piece, cam control reciprocating means for reciprocating said cutting tool a given maximum distance a predetermined number of times per revolution of the work piece, means of adjusting the position of the tool as it is transported laterally of the work piece so as to impart a different diameter to said work piece longitudinally thereof, and compensatory means for adjusting the support for the cutting tool, on which support it moves to effect its longitudinal and cyclic in and out cutting movements on the work piece whereby the distance of movement in and out of said cutting tool is modified according to its longitudinal position with respect to said work piece.

5. In combination, a lathe having means for rotating a work piece, a cutting tool, a cam and cam slide, a lever pivoted remotely from said cam slide at one end and to the cam slide at the other end, a pitman slidably mounted on said lever between its pivotal support and it attachment to the cam slide, said pitman being slidably mounted on said lever, a cutting tool and its slide reciprocably operated by said pitman, means for rotating said cam at a predetermined rate with respect to the rotation of said work piece; means for adjusting the position of said cutting tool with respect to the longitudinal axis of the work piece; means for moving said cutting tool longitudinally of the longitudinal axis of the work piece; and compensatory means for automatically adjusting the position of said pitman on said lever according to the tapered cut being imparted to the work piece as the cutting tool progresses longitudinally thereof.

6. In combination, a lathe having means for rotating a work piece, a cutting tool, a cam and cam slide, a lever pivoted remotely from said cam slide at one end and to the cam slide at the other end, a pitman slidably mounted on said lever between its pivotal support and its attachment to the cam slide, said pitman being slidably mounted on said lever, a cutting tool and its slide reciprocably operated by said pitman, means for rotating said cam at a predetermined rate with respect to the rotation of said work piece; means for adjusting the position of said cutting tool with respect to the longitudinal axis of the work piece; means for moving said cutting tool longitudinally of the longitudinal axis of the work piece; and compensatory means for automatically adjusting the position of said pitman on said lever according to the tapered cut being imparted to the work piece as the cutting tool progresses longitudinally thereof, said last mentioned means comprising a bell crank, means for adjusting the angular position of said bell crank, a rack connected to one arm of said bell crank, a pinion, and associated rack and pinion mechanism regulating the inward and outward movement of the support for said cutting tool whereby the adjustment of said bell crank will determine the length of the inward and outward stroke of said cutting tool.

7. In combination, in a lathe, means for rotating a work piece, a cross slide, a carriage mounted on said cross slide, a tool slide mounted on said carriage, means to impart a cyclic in and out movement to said tool slide a predetermined number of times of revolutions of the work piece, a cutting tool on said tool slide, means to move said cross slide, carriage and tool slide, together with said cyclic means, longitudinally of said work piece, means to guide said means at an angle to the longitudinal axis of the work piece, and a compensatory means for regulating the length of stroke of said cutting tool by adjusting the position of said carriage with reference to said cross slide.

8. In combination, in a lathe, means for rotating a work piece, a cross slide, a carriage, a tool slide mounted on said cross slide, means to impart a cyclic in and out movement to said tool slide a predetermined number of times of revolutions of the work piece, a cutting tool on said tool slide, means to move said cross slide, carriage and tool slide, together with said cyclic means, longitudinally of said work piece, means to guide said means at an angle to the longitudinal axis of the work piece, and a compensatory means for regulating the length of stroke of said cutting tool by adjusting the position of said carriage with reference to said cross slide, said compensatory means comprising a bell crank, means for adjusting the angular position of said bell crank, a rack connected to said bell crank, a second rack associated with said carriage, and a common axle and pinions engaging said respective racks whereby the movement of the first mentioned rack of the compensatory means will move said carriage and its rack to adjust the position of said carriage inwardly with respect to the axis of said work piece.

9. In combination, means to rotate a work piece at a predetermined speed, a cam driven in synchronism with said rotating means, a cutting tool, means controlled by said cam for reciprocating said cutting tool, means to adjust the extent of the movement of the cutting tool by said cam to regulate the length of the stroke thereof, means to support said tool to guide it longitudinally of the work piece, means for feeding said tool angularly as it is fed lengthwise, and compensatory means for adjusting the length of the stroke of said cutting tool as operated by said cam according to its angular adjustment with respect to the longitudinal axis of the work piece.

10. In combination, a lathe having means for rotating a work piece, a cam driven in synchronism therewith, a cam slide, a lever reciprocated thereby, a pitman slidably mounted on said lever, means of adjusting the location of said pitman on said lever, a cutting tool connected to said pitman and actuated thereby, means of supporting and moving said cutting tool, cam and associated means longitudinally of the work piece at an angle thereto, and compensatory means according to the angular disposition of said cutting tool for adjusting the length of the stroke of the tool at each cyclic movement by the rotation of the cam.

11. In combination, in a lathe, of means for supporting a work piece including a headstock and driving means therein, means synchronously driven therefrom including a slidable and rotatable driven shaft; a cam driven thereby, means of supporting said cam and transporting it longitudinally of said work piece, a cutting tool on said supporting means, a tool slide thereon, means connecting said tool slide to said cam for reciprocation thereby, compensatory means for adjusting the length of the stroke of said cutting tool as actuated by said cam, and means for moving said tool and its support bodily laterally with respect to the longitudinal axis of said work piece, as the tool moves lengthwise of the work piece.

12. In combination, in a lathe, of means for supporting a work piece including a headstock and driving means therein, means synchronously driven therefrom including a slidable and rotatable driven shaft; a cam driven thereby, means of supporting said cam and transporting it longitudinally of said work piece, a cutting tool on said supporting means, a tool slide thereon, means connecting said tool slide to said cam for reciprocation thereby, means for moving said tool and its support bodily laterally with respect to the longitudinal axis of said work piece, compensatory means for adjusting the length of the stroke of said cutting tool as the tool moves lengthwise and means for manually adjusting the extent of the stroke of said tool inwardly and outwardly of said work piece as actuated by said cam.

13. In combination, in a lathe, of means for supporting a work piece including a headstock and driving means therein, means synchronously driven therefrom including a slidable and rotatable driven shaft; a cam driven thereby, means of supporting said cam and transporting it longitudinally of said work piece, a cutting tool on said supporting means, a tool slide thereon, means connecting said tool slide to said cam for reciprocation thereby, means for moving said tool and its support bodily laterally with respect to the longitudinal axis of said work piece, compensatory means for adjusting the length of the stroke of said cutting tool as the tool moves lengthwise, means for manually adjusting the extent of the stroke of said tool inwardly and outwardly of said work piece as actuated by said cam, and means of adjusting the angular positioning of said cutting tool to said work piece.

14. In combination, in a lathe, a head-stock casing, a driving spindle therein, a bracket assembly mounted on said head-stock casing, a gear train mounted thereon having replaceable gears for different gear ratios, said bracket assembly having means for varying the distance between the centers of the gears a sleeve mounted in the last of said driven gears, means for driving said gears from said headstock mechanism, and a splined driven shaft slidably mounted within said sleeve and said gear whereby said driven shaft may move longitudinally of said head-stock mechanism while it is being driven in synchronism therewith.

15. In combination, in a lathe, a head-stock casing, a driving spindle therein, a bracket assembly mounted on said head-stock casing, a gear train mounted thereon having replaceable gears for different gear ratios, said bracket assembly having an elongated guide portion for adjustably supporting said gears for varying the distances between the centers thereof, a sleeve mounted in the last of said driven gears, means for driving said gears from said head-stock mechanism, a splined driven shaft slidably mounted within said sleeve and said gear whereby said driven shaft may move longitudinally of said head-stock while it is being driven in synchronism therewith, and means for pivotally mounting said bracket assembly with respect to said head-stock casing.

16. In a lathe, a compensatory attachment comprising a bell crank, means of pivotally supporting said bell crank, means of angularly positioning said bell crank upon its pivotal support, a rack pivotally secured to the end of said bell crank, a second rack and pinions associated with the first mentioned rack, and a tool supporting means carried with and positioned by said second rack whereby the movements of said tool positioning means are regulated by the positioning of the first-mentioned rack of said compensatory mechanism.

17. In a compensatory mechanism for a lathe, a bell crank having slotted arms, means of pivotally supporting the bell crank, means of adjusting the position of a block carried in the slot of one of said arms so as to rotate said bell crank, a rack pivotally mounted on the block on the other of said arms, a tool-supporting means having a parallel rack, and pinions interconnecting said racks whereby the movement of the tool-supporting means will be controlled by the positioning of the first-mentioned rack through said bell crank.

18. In a lathe, a tool, a tool slide, a cam, a cam follower, a pivoted member operatively connected to said cam follower, an element adapted to engage said pivoted member at varying distances from its pivotal axis, means for adjusting the point of engagement of said element with said pivoted member to vary the distance of engagement relatively to its pivotal axis, and means including adjustable throw means interconnecting said element and said tool for actuating said tool in response to the motion of said pivoted member as directed by the configuration of said cam.

19. In a lathe, a tool, a tool slide, a cam, a cam follower, a pivoted member operatively connected to said cam follower, an element having a swivel device adapted to engage said pivoted member at varying distances from its pivotal axis, and means including adjustable throw means interconnecting said element and said tool for actuating said tool in response to the motion of said pivoted member as directed by the configuration of said cam.

20. In a lathe, a tool, a tool slide, a cam, a cam follower, a pivoted member operatively connected to said cam follower, an element adapted to engage said pivoted member at varying distances from its pivotal axis, said element including a slide, and a swinging member actuated by the motion of said element slide and engaging said tool slide, whereby to actuate said tool in response to the motion of said pivoted member as directed by the configuration of said cam.

21. In a lathe, a tool, a tool slide, a cam, a cam follower, a pivoted member operatively connected to said cam follower, an element adapted to engage said pivoted member at varying distances from its pivotal axis, said element including a slide, and a swinging member actuated by the motion of said element slide and engaging said tool slide, whereby to actuate said tool in response to the motion of said pivoted member as directed by the configuration of said cam, said swinging member comprising a plurality of relatively adjustable portions.

22. In a lathe, a tool, a tool slide, a cam, a cam follower, a pivoted member operatively connected to said cam follower, an element adapted to engage said pivoted member at varying distances from its pivotal axis, said element including a slide, and a swinging member actuated by the motion of said element slide and engaging said tool slide, whereby to actuate said tool in response to the motion of said pivoted member as directed by the configuration of said cam, said swinging member comprising a plurality of relatively adjustable portions having frictionally operative means for locking said portions in their adjusted positions.

23. In a lathe, a tool, a tool slide, a cam, a cam follower, a pivoted member operatively engaged by said cam follower, a swinging member engaging said tool slide, and means including adjustable throw means interconnecting said swinging member and said pivoted member whereby to actuate said tool in response to the motion of said pivoted member as directed by the configuration of said cam.

24. In a lathe, a tool, a tool slide, a cam, a cam follower, a pivoted member operatively engaged by said cam follower, a swinging member engaging said tool slide, and means including adjustable throw means interconnecting said swinging member and said pivoted member whereby to actuate said tool in response to the motion of said pivoted member as directed by the configuration of said cam, said swinging member having relatively adjustable portions.

25. In a lathe, a tool, a tool slide, a cam, a cam follower, a pivoted member operatively engaged by said cam follower, a swinging member engaging said tool slide, means including adjustable throw means interconnecting said swinging member and said pivoted member whereby to actuate said tool in response to the motion of said pivoted member as directed by the configuration of said cam, said swinging member having relatively adjustable portions, and frictionally operative means for locking said swinging member portions in their adjusted positions.

26. In a lathe, a tool, a tool slide, a cam, a cam follower, a pivoted member operatively engaged by said cam follower, a swinging member engaging said tool slide, and means including adjustable throw means interconnecting said swinging member and said pivoted member whereby to actuate said tool in response to the motion of said pivoted member as directed by the configuration of said cam, said swinging member having portions adjustable angularly relatively to each other around the swinging axis thereof.

27. In a lathe, a tool, a carriage, a taper-forming device, a cam, means including adjustable throw means interconnecting said cam and said tool for moving said tool in response to the configuration of said cam, and compensating means for varying the stroke of said tool in response to the action of said taper-forming device.

28. In a lathe, a tool, a carriage, a taper-forming device, a cam, a cam follower, a pivoted member engaged by said cam follower, means interconnecting said pivoted member and said tool for moving said tool in response to the motion of said pivoted member as directed by the configuration of said cam, and compensating means responsive to the action of said taper-forming device for varying the point of engagement of said interconnecting means with said pivoted member, whereby to vary the stroke of said tool in compensation for the operation of said taper-forming device.

29. In a lathe, a tool, a carriage, a taper-forming device, a cam, a cam follower, a pivoted member engaged by said cam follower, means interconnecting said pivoted member and said tool for moving said tool in response to the motion of said pivoted member as directed by the configuration of said cam, a rack associated with said carriage, a pinion meshing therewith, a gear connected to said pinion, a second rack meshing with said gear, and means operated by the motion of said second rack for varying the location of engagement of said interconnecting means with said pivoted member whereby to vary the stroke of said tool in compensation for the operation of said taper-forming device.

30. In a lathe, a tool, a carriage, a taper-forming device, a cam, a cam follower, a pivoted member engaged by said cam follower, means interconnecting said pivoted member and said tool for moving said tool in response to the motion of said pivoted member as directed by the configuration of said cam, a rack associated with said carriage, a pinion meshing therewith, a gear connected to said pinion, a second rack meshing with said gear, a crank member operated by the motion of said second rack, and devices operatively joining said crank member and said interconnecting means for varying the location of engagement of said interconnecting means with said pivoted member whereby to vary the stroke of said tool in compensation for the operation of said taper-forming device.

31. In a lathe, a tool, a carriage, a taper-forming device, a cam, a cam follower, a pivoted member operated thereby in response to the configuration of said cam, an element adapted to engage said pivoted member at varying distances from its pivotal axis, a movable support for said element, means interconnecting said element with said tool for transmitting thereto the motion of said pivoted member as directed by the configuration of said cam, and compensating means responsive to the action of said taper-forming device for moving said support to vary the point of engagement of said element with said pivoted member whereby to vary the stroke of said tool in compensation for the operation of said taper-forming device.

32. In a lathe, a tool, a carriage, a taper-forming device, a cam, a cam follower, a pivoted member operated thereby in response to the configuration of said cam, an element adapted to engage said pivoted member at varying distances from its pivotal axis, a movable support for said element, means interconnecting said element with said tool for transmitting thereto the motion of said pivoted member as directed by the configuration of said cam, a rack associated with said carriage, a pinion meshing therewith, a gear connected to said pinion, a second rack meshing with said gear, and mechanism operatively joining said second rack and said support for moving said support to vary the point of engagement of said element with said pivoted member whereby to vary the stroke of said tool in compensation for the operation of said taper-forming device.

33. A slide assembly for machines comprising a support with a plurality of parallel members having opposed V-grooves, a slide arranged therebetween having V-grooves facing the grooves in said parallel members, balls arranged in the facing grooves between said slide and said support members and adapted to provide anti-friction reciprocation of said slide relatively to said support, and means for moving one of said members transversely to said grooves to provide an adjustment of the clearances for said balls in said grooves.

34. A shape lathe including a chuck, an auxiliary spindle, means for driving the chuck and spindle in timed relation, a master record secured to the spindle, a cross-slide, a tool holder reciprocably mounted on the cross-slide, a transmission bar slidably mounted adjacent the record, a tracer member on the bar and cooperating with the record, a lever pivoted to the cross-slide and connected to the transmission bar, and a connection between said lever and tool holder, said lathe further including a hand compensating slide and a power compensating slide.

35. A shape lathe including a chuck, an auxiliary spindle, means for driving the chuck and spindle in timed relation, a master record secured to the spindle, a cross-slide, a tool holder reciprocably mounted on the cross slide, a transmission bar slidably mounted adjacent the record, a tracer member on the bar and cooperating with the record, a lever pivoted to the cross-slide and operatively connected to the transmission bar, a plate slidably connected to said lever, and a connection between said plate and tool holder, said lathe further including a hand compensating slide and a power compensating slide.

36. In a reproducing shape lathe, a chuck, a spindle geared to the main shaft of the lathe, means on said spindle adapted to support a master record, a support for a tracer member mounted adjacent said spindle, and adapted to support a cutting tool, a tool holder reciprocably mounted adjacent the chuck, and a connection between the tracer member support and the tool holder, whereby the lathe is adapted to either reproduce shapes recorded on the master record or to cut a master record in accordance with a model supported in the chuck, said lathe further including a hand compensating slide and a power compensating slide, and means for moving the hand slide relatively to said power slide.

37. In a reproducing shape lathe, a chuck, a spindle geared to the main shaft of the lathe, means on said spindle adapted to support a master record or a master record blank, a support for a tracer member mounted adjacent said spindle and adapted to support a cutting tool, a tool or tracer holder reciprocably mounted adjacent the chuck, a connection between the tracer member support and the tool holder, whereby the lathe is adapted to either reproduce shapes recorded on the master record or to cut a master record in accordance with a model supported in the chuck, and a compensating device for modifying the reciprocating movement of the tool holder in accordance with its distance from the lathe axis, said lathe further including a hand compensating slide and a power compensating slide, and means for moving the hand slide relatively to said power slide.

38. A reproducing shape lathe including a rotatably mounted chuck adapted to support a model, a tracer member movably mounted adjacent the chuck for cooperation with the model, an auxiliary spindle adapted to support a record blank, means for driving the chuck and spindle in timed relation, a cutting tool movably mounted adjacent the auxiliary spindle, and a connection between the tracer member and cutting tool, said connection including a compensating mechanism for automatically varying the throw of the cutting tool, said lathe further including a hand compensating slide and a power compensating slide, and means for moving the hand slide relatively to said power slide, including screw adjusting means, and hand operated means on said screw means.

39. A reproducing shape lathe for reproducing shapes having a circumferentially repeated design, including a rotatably mounted chuck for supporting a model having the repeated design, a tracer member movably mounted adjacent the chuck for cooperation with the model, an auxiliary spindle adapted to support a record blank and geared to rotate in timed relation with the chuck and at a ratio with the lathe chuck corresponding to the number of repetitions of the design, a cutting tool movably mounted adjacent the auxiliary spindle, and a connection between the tracer member and cutting tool, said lathe further including a hand compensating slide and a power compensating slide, and means for moving the hand slide relatively to said power slide, including screw adjusting means, and hand operated means on said screw means.

CLIFFORD A. BICKEL.
KURT H. WILLS.